(12) United States Patent
Katayama et al.

(10) Patent No.: US 8,717,624 B2
(45) Date of Patent: May 6, 2014

(54) COLOR VALUE ACQUIRING METHOD USED IN PRINTING SYSTEM, INVOLVES ACQUIRING COLOR VALUE WHICH CORRESPONDS TO COLOR PATCH SELECTED AS REPRESENTING COLOR THAT IS CLOSE TO DESIGNATED COLOR TO BE REPRODUCED, FROM WITHIN PRINTED COLOR CHART

(75) Inventors: Takeshi Katayama, Tokyo (JP); Eiji Teraue, Tokyo (JP); Eiichi Uchida, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 199 days.

(21) Appl. No.: 13/238,915

(22) Filed: Sep. 21, 2011

(65) Prior Publication Data

US 2012/0081722 A1 Apr. 5, 2012

(30) Foreign Application Priority Data

Sep. 30, 2010 (JP) ................ 2010-221793

(51) Int. Cl.
*G06K 1/00* (2006.01)
*G06K 9/00* (2006.01)

(52) U.S. Cl.
USPC ............ 358/1.9; 358/504; 382/162

(58) Field of Classification Search
None
See application file for complete search history.

(56) References Cited

U.S. PATENT DOCUMENTS

| 6,324,975 | B1 * | 12/2001 | Kondo ................. 101/171 |
| 6,804,025 | B1 | 10/2004 | Ueda et al. |
| 7,239,402 | B2 | 7/2007 | Soler et al. |
| 7,898,704 | B2 * | 3/2011 | Doi et al. .............. 358/504 |
| 8,045,186 | B2 * | 10/2011 | Sakurai ............. 358/1.12 |
| 8,488,188 | B2 * | 7/2013 | Nomura .............. 358/1.9 |
| 8,493,403 | B2 * | 7/2013 | Tastl et al. ............. 345/600 |
| 2005/0265597 | A1 * | 12/2005 | Ono ................. 382/162 |
| 2006/0204084 | A1 * | 9/2006 | Matsuura ............ 382/162 |
| 2006/0232771 | A1 | 10/2006 | VanDuyn et al. |
| 2007/0177029 | A1 | 8/2007 | Wada et al. |
| 2007/0182754 | A1 | 8/2007 | Park et al. |

FOREIGN PATENT DOCUMENTS

| JP | 2000-217007 A | 8/2000 |
| JP | 2003-134349 A | 5/2003 |

OTHER PUBLICATIONS

Chinese Office Action and Chinese Search Report for Chinese Application No. 201110305105.4 dated Jan. 3, 2014, with English translation.

* cited by examiner

*Primary Examiner* — Steven Kau

(74) *Attorney, Agent, or Firm* — Birch, Stewart, Kolasch & Birch, LLP

(57) ABSTRACT

The shape of a target mark extracted from within a print sample and to be reproduced on a print is entered. A color chart is printed comprising multiple color patches in which the shape of the target mark is simulated.

19 Claims, 15 Drawing Sheets

|     | (1') | (0') | (-1') | (1) | (0) | (-1) | (1") | (0") | (-1") |
|-----|------|------|-------|-----|-----|------|------|------|-------|
|     | +1   | +1   | +1    | 0   | 0   | 0    | -1   | -1   | -1    |
| (1) | +1   | 0    | -1    | +1  | 0   | -1   | +1   | 0    | -1    |
|     | +1   | +1   | +1    | +1  | +1  | +1   | +1   | +1   | +1    |
|     | +1   | +1   | +1    | 0   | 0   | 0    | -1   | -1   | -1    |
| (0) | +1   | 0    | -1    | +1  | 0   | -1   | +1   | 0    | -1    |
|     | 0    | 0    | 0     | 0   | 0   | 0    | 0    | 0    | 0     |
|     | +1   | +1   | +1    | 0   | 0   | 0    | -1   | -1   | -1    |
| (-1)| +1   | 0    | -1    | +1  | 0   | -1   | +1   | 0    | -1    |
|     | -1   | -1   | -1    | -1  | -1  | -1   | -1   | -1   | -1    |

COLOR VALUE ACQUIRING METHOD USED IN PRINTING SYSTEM, INVOLVES ACQUIRING COLOR VALUE WHICH CORRESPONDS TO COLOR PATCH SELECTED AS REPRESENTING COLOR THAT IS CLOSE TO DESIGNATED COLOR TO BE REPRODUCED, FROM WITHIN PRINTED COLOR CHART

CROSS-REFERENCE TO RELATED APPLICATION

This application is based upon and claims the benefit of priority from Japanese Patent Application No. 2010-221793 filed on Sep. 30, 2010, of which the contents are incorporated herein by reference.

BACKGROUND OF THE INVENTION

1. Field of the Invention

The present invention relates to a color value acquiring method, an image processing method, a color value acquiring apparatus, an image processing apparatus, and a recording medium having a program recorded therein for printing a color chart that includes a plurality of color patches, and for acquiring color values corresponding to the color patches, which are selected from within the color chart.

2. Description of the Related Art

With significant advances in inkjet technology in recent years, it is becoming possible for inkjet printers to produce large color prints of high quality at high speeds. Inkjet printers are not only popular for private or home use, but also are widely used for public use or in commercial applications nowadays. Inkjet printers make it possible to print on POP (Point Of Purchase) posters, wall posters, large-size mediums such as outdoor advertisements and billboards, roll mediums, and thick hard mediums.

Since advertisement prints are expected to be effective to arouse consumers' motivation to buy advertised products through visual sensation, the finish of colors in such prints is of particular importance. Heretofore, there have been disclosed various color matching technologies, such as a method of generating an ICC (International Color Consortium) profile, a method of adjusting a spot color (hereinafter referred to as a "designated color"), etc., as print color managing means.

A method of adjusting a designated color includes making fine adjustments of the color of an area of interest in a color image in order to bring the color into substantial conformity with a designated color to be reproduced on a print, using color samples such as color chips, etc. More specifically, actual color values of a color sample and color values for reproducing the designated color with a printing machine are acquired, and a print color is corrected based on the difference between the acquired color values.

For example, Japanese Laid-Open Patent Publication No. 2000-217007 discloses a method of setting a display device to display a designated color on a screen image (display window), visually observing a printed color chart, selecting a color closest to the designated color from color patches provided in twenty-seven colors, and entering a number of the selected color through the screen image. The patent publication states that it is possible to cause the designated color displayed on the display device and a color printed by a printing machine to strictly approximate to each other.

In Japanese Laid-Open Patent Publication No. 2003-134349, a color chart is disclosed, in which a background region (hereinafter referred to as a "surrounding region") thereof surrounding each of a plurality of color patches respectively is colored in a predetermined color. In particular, due to the different color of the surrounding region, it is suggested that cases occur in which the color selection result may be slightly different, since the visual effect perceived by the operator is different.

SUMMARY OF THE INVENTION

However, even in the case of the same background color, due to a change in the shape of the marks (hereinafter also referred to as target marks) that make up the target for color adjustment, the appearance of colors of the target marks tends to change. The visual effect thereof is known as an area effect, the Von Bezold effect, etc.

Due to the foregoing reasons, in the event that the shape of a target mark is complex, such as a logo mark or marks comprising Chinese characters or the like, it has been discovered through experience that the possibility is high that a sense of matching (consistency) between a designated color and the color of a region of interest on a print, which has been adjusted in color, is difficult to obtain.

Notwithstanding, in the color charts disclosed in Japanese Laid-Open Patent Publication 2000-217007 and Japanese Laid-Open Patent Publication 2003-134349, because color patches, which are to be subjected to comparative observation, are of a constant shape (e.g., square shaped), the influence on the visual effect varies responsive to the shape of the target mark. In this case, based on the experience and intuition of the operator, matching of colors must be carried out through trial and error, and as a result, a large number of process steps and man-hours have been required.

An object of the present invention is to provide a color value acquiring method, an image processing method, a color value acquiring apparatus, an image processing apparatus, and a recording medium having a program recorded therein, which are capable of solving the aforementioned problems. According to the present invention, even if the target marks are complex in shape, the influence thereof on the visual effect due to differences in shapes of the target marks can be reduced, and thus the efficiency of color adjustment operations performed on the target marks can be improved.

A color value acquiring method according to the present invention comprises an entry step of entering a shape of a target mark extracted from within a print sample and to be reproduced on a print, a printing step of printing a color chart comprising a plurality of color patches in which the shape of the entered target mark is simulated, and a color value acquiring step of acquiring a color value, which corresponds to a color patch selected as representing a color that is close to a designated color to be reproduced, from within the printed color chart.

Preferably, the color value acquiring method further comprises a size determining step of determining a data area size for each of the color patches, corresponding to an output resolution of the print sample, and a generating step of generating image data for printing the color chart based on the determined data area size.

Moreover, the size determining step preferably comprises determining the data area size, such that a size of the respective color patches on the color chart matches a size of the target mark on the print sample.

Preferably, the size determining step comprises determining the data area size, such that a size of the respective color patches on the color chart is a constant value irrespective of the output resolution.

The color value acquiring method preferably further comprises an extraction step of extracting from within the print sample an object in which the target mark is included, wherein the color chart comprises a plurality of objects of different colors each obtained by combining a residual portion in which the target mark is clipped from the extracted object and each of target marks of different colors as the plurality of color patches.

Preferably, in the entry step, partial data representative of the print sample are extracted and entered as a shape of the target mark.

Further, the entry step preferably further includes entering color information of the target mark, and the color value acquiring method further comprises a determining step of determining respective colors of the plurality of color patches, based on the entered color information of the target mark.

The color value acquiring method preferably further comprises a standard color correcting step of correcting a standard color which is close to the designated color, corresponding to a difference between a size of the color patches on the color chart and a size of the target mark on the print sample.

Further, the entry step preferably further includes entering color information of a background portion of the target mark, and the color value acquiring method further comprises a region color determining step of determining a color of a surrounding region that surrounds the plurality of color patches, based on the entered color information of the background portion.

Moreover, the entry step preferably further includes entering a plurality of color values obtained by colorimetrically measuring a plurality of locations within a region of the background portion, and the region color determining step preferably includes determining the color of the surrounding region using a statistical process with respect to the entered plurality of color values.

An image processing method according to the present invention comprises an entry step of entering a shape of a target mark extracted from within a print sample and to be reproduced on a print, a printing step of printing a color chart comprising a plurality of color patches in which the shape of the entered target mark is simulated, a first acquiring step of acquiring a first color value, which corresponds to a color patch selected as representing a color that is close to a designated color to be reproduced, from within the printed color chart, a second acquiring step of acquiring a second color value, which is a color value of the designated color, and a color adjusting step of performing color adjustment on the print to be printed, based on the acquired first color value and the acquired second color value.

A color value acquiring apparatus according to the present invention comprises a sample shape acquirer for acquiring a shape of a target mark extracted from within a print sample and to be reproduced on a print, an image data generator for generating image data for printing a color chart comprising a plurality of color patches in which the shape of the target mark acquired by the sample shape acquirer is simulated, and a color value acquirer for acquiring a color value, as a selected color value, which corresponds to a color patch selected as representing a color that is close to a designated color to be reproduced, from within the color chart, which is printed based on the image data generated by the image data generator.

The color value acquiring apparatus preferably further comprises a display unit for displaying color information pertaining to the selected color value acquired by the color value acquirer.

The color value acquiring apparatus preferably further comprises a data converter for converting the selected color value into device dependent data of a printing machine using a profile of the printing machine for printing the print, wherein the display unit further displays the device dependent data, which has been converted by the data converter.

An image processing apparatus according to the present invention comprises a sample shape acquirer for acquiring a shape of a target mark extracted from within a print sample and to be reproduced on a print, an image data generator for generating image data for printing a color chart comprising a plurality of color patches in which the shape of the target mark acquired by the sample shape acquirer is simulated, a first color value acquirer for acquiring a first color value, which corresponds to a color patch selected as representing a color that is close to a designated color to be reproduced, from within the color chart, which is printed based on the image data generated by the image data generator, a second color value acquirer for acquiring a second color value, which is a color value of the designated color, and a print color adjuster for performing color adjustment on the print to be printed, based on the first color value acquired by the first color value acquirer and the second color value acquired by the second color value acquirer.

A recording medium according to the present invention stores therein a program for acquiring a color value, for enabling a computer to function as a sample shape acquirer for acquiring a shape of a target mark extracted from within a print sample and to be reproduced on a print, an image data generator for generating image data for printing a color chart comprising a plurality of color patches in which the shape of the target mark acquired by the sample shape acquirer is simulated, and a color value acquirer for acquiring a color value, which corresponds to a color patch selected as representing a color that is close to a designated color to be reproduced, from within the color chart, which is printed based on the image data generated by the image data generator.

In accordance with the color value acquiring method, the image processing method, the color value acquiring apparatus, the image processing apparatus, and the recording medium of the present invention, the shape of a target mark extracted from within a print sample, and which is to be reproduced on a print, is entered, and a color chart is printed comprising a plurality of color patches in which the shape of the entered target mark is simulated. Therefore, from within the color chart, which resembles the rendered content of the print sample, a color patch can be selected which is close in color to a designated color. More specifically, even in the case that the target mark is of a complex shape, the influence on the visual effect due to differences in the shape of the target mark is reduced, and thus, operational efficiency of the color adjustment process can be improved.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An image processing method (or color value acquiring method) according to the present invention, in relation to an image processing apparatus (or color value acquiring apparatus) and a printing system for carrying out the image processing method (or the color value acquiring method), will be described in detail below with reference to the accompanying drawings.

Figure 1:
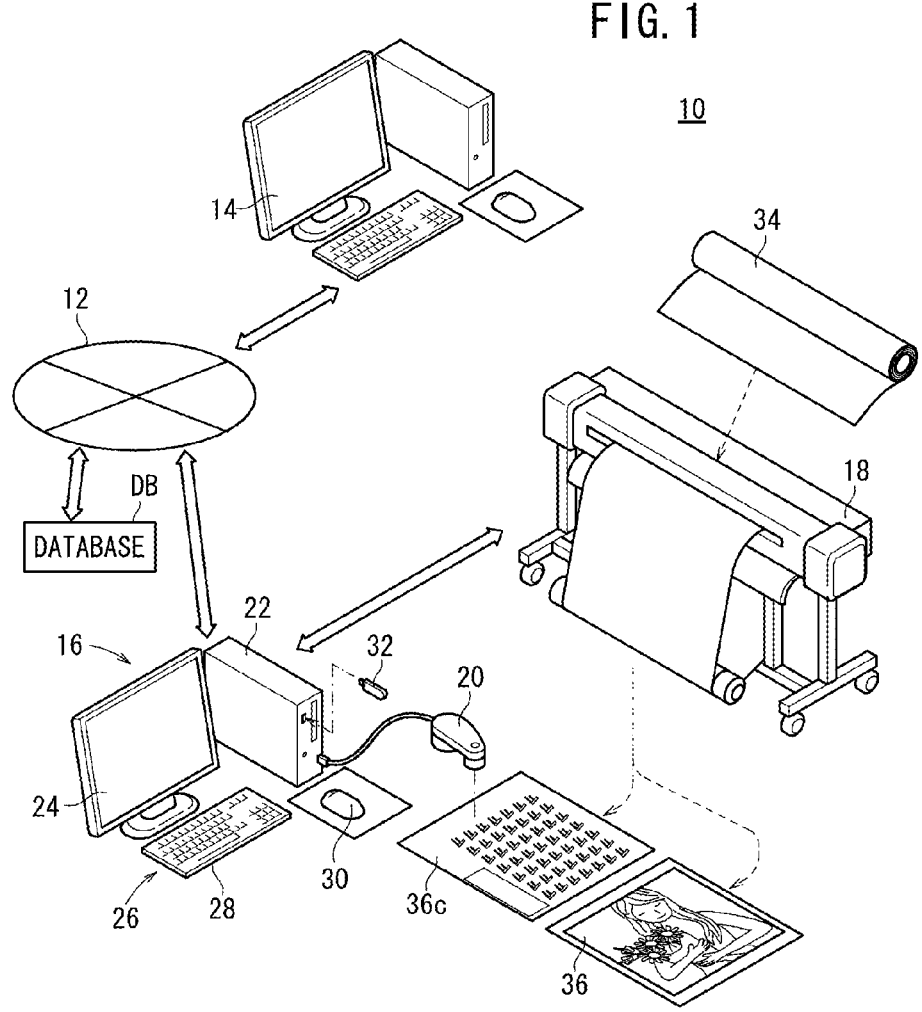
FIG. 1 is a perspective view of a printing system incorporating an image processing apparatus (or a color value acquiring apparatus) according to an embodiment of the present invention.

FIG. 1 is a perspective view of a printing system 10 incorporating an image processing apparatus (color value acquiring apparatus) 16 according to an embodiment of the present invention.

The printing system 10 basically comprises a network 12, an editing apparatus 14, an image processing apparatus 16, a printing machine 18, and a colorimeter 20. The network 12 is constructed according to communication standards such as Ethernet (registered trademark) or the like. The editing apparatus 14 and the image processing apparatus 16 are connected to each other and also to a database DB by a wired or wireless link over the network 12.

The editing apparatus 14 is capable of editing an arrangement of color images made up of characters, figures, pictures, photos, etc., on each of pages to be printed. The editing apparatus 14 generates electronic manuscripts (print data) in a page description language (hereinafter referred to as "PDL"), e.g., 8-bit image data in color channels of four colors (C, M, Y, K) or three colors (R, G, B).

PDL refers to a language, which is descriptive of image information including format information, positional information, color information (including density information), etc., of characters, figures, etc., in a "page" that serves as an output unit for printing, displaying, or the like. Known types of PDL include PDF (Portable Document Format according to IS032000-1:2008), PostScript (registered trademark) of AdobeSystems, and XPS (XML Paper Specification).

The image processing apparatus 16 functions to convert an electronic manuscript described by PDL into an electronic manuscript represented by raster data in a raster format, e.g., bitmap image data or TIFF data, perform desired image processing, e.g., a color conversion process, an image scaling process, an image arranging process, etc., on the raster data, convert the processed raster data into print control signals that match the printing machine 18, and send print control signals to the printing machine 18.

The image processing apparatus 16 comprises a main unit 22 including a CPU, a memory, etc., a display device (display unit) 24 for displaying color images, and an input device 26 serving as an input unit including a keyboard 28 and a mouse 30 for entering various data and operation commands to the main unit 22. The mouse 30, which serves as a pointing device, may be replaced with a track pad or a track ball.

A portable memory 32 for recording electronic data therein and deleting electronic data therefrom, and the colorimeter 20 are connected to the main unit 22 of the image processing apparatus 16.

The printing machine 18 comprises an inkjet printing apparatus for producing a color image based on a combination of standard inks of colors C, M, Y, K (process colors), and optional inks of light colors such as LC, LM, etc., and W (white). The printing machine 18 controls the propulsion of inks onto a print medium 34 (rolled non-printed medium 34 in FIG. 1), based on a print control signal received from an external apparatus, e.g., the image processing apparatus 16, so as to print a color image on the print medium 34, thereby producing a print 36, which may include a color chart 36c.

The print medium 34 may comprise a paper medium such as synthetic paper, thick paper, aluminum-evaporated paper, or the like, a resin medium comprising vinyl chloride, PET, or the like, or tarpaulin, or the like.

The colorimeter 20 measures color values of an object to be measured, depending on a prescribed colorimetric processing command. Color values refer not only to device-independent data, such as tristimulus values X, Y, Z, the coordinates L*, a*, b* of a uniform color space, etc., but also to a distribution of optical physical quantities with respect to wavelengths (hereinafter referred to as "spectral data"). Spectral data may represent a spectral radiance distribution, a spectral sensitivity distribution, spectral reflectivity, or spectral transmittance, for example.

The database DB comprises a database server for managing data such as job tickets of electronic manuscripts, e.g., JDF (Job Definition Format) files, color sample data, target profiles, or profiles suitable for respective print mediums 34.

Figure 2:
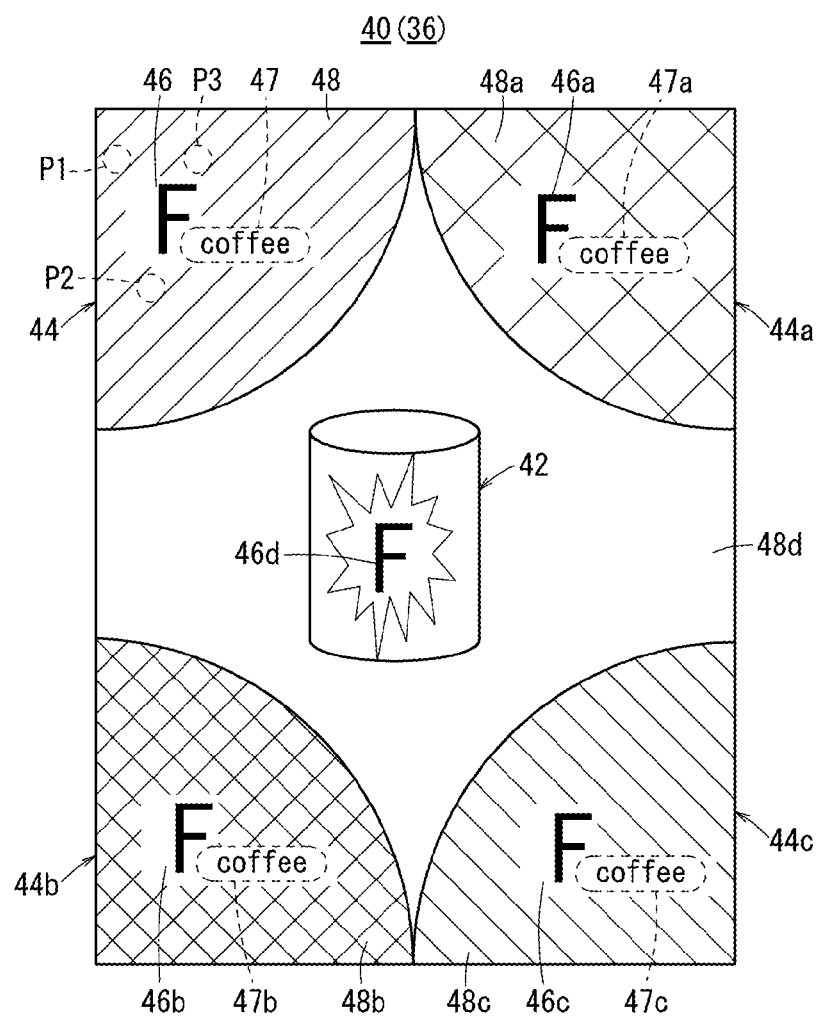
FIG. 2 is a schematic front elevational view of a print sample to be printed using the printing system of FIG. 1.

FIG. 2 is a frontal view in outline of a print sample 40 to be printed using the printing system 10 of FIG. 1. In a center portion of the print sample 40, an object 42 is rendered in which a cylindrical coffee can is represented as an oblique projection. In the upper left corner of the print sample 40, a fan shaped target region 44 is drawn. The target region 44 is constituted by a logo mark in which a capital letter "F" (hereinafter referred to as a "target mark 46") is shown in bold, a product name 47 in which the word "coffee" is represented, and a background portion 48, which is colored uniformly by a predetermined color.

In the present specification, the term "background portion" implies an image region outside of the target mark 46, which upon visual perception of the target mark 46 by ordinary methods, corresponds to an image region to which at least a visual effect is imparted. Consequently, the background portion 48 is not limited to being in intimate abutment around (or completely surrounding the outline of) the target mark 46, but also to a case of being closely proximate (or near) to (or partially surrounding or near the outline of) the target mark 46 in general.

In the upper right corner of the print sample 40, a fan shaped first region 44a is drawn. The first region 44a is constituted by a target mark 46a, a product name 47a, and a background portion 48a, which is colored uniformly by a first color. In the lower left corner of the print sample 40, a fan shaped second region 44b is drawn. The second region 44b is constituted by a target mark 46b, a product name 47b, and a background portion 48b, which is colored uniformly by a second color. In the lower right corner of the print sample 40, a fan shaped third region 44c is drawn. The third region 44c is constituted by a target mark 46c, a product name 47c, and a background portion 48c, which is colored uniformly by a third color.

In a center portion of the object 42, a target mark 46d is drawn. The periphery around the object 42 includes a background portion 48d, which is colored uniformly by a fourth color.

The target marks 46 and 46a through 46d are of the same shape and color. Further, the colors (i.e., the predetermined color and the first through fourth colors) of the background portions 48 and 48a through 48d differ respectively from each other.

Figures 3A, 3B:
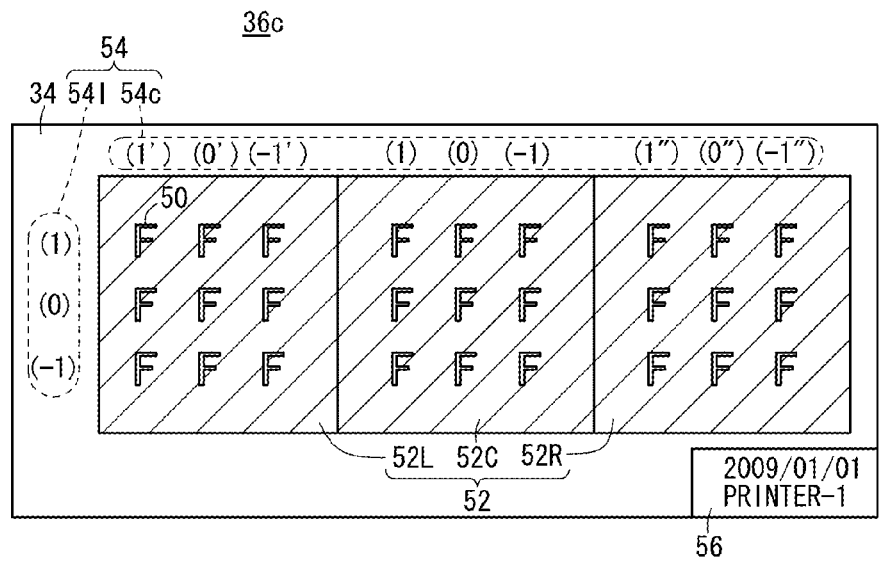
FIG. 3A is a schematic explanatory drawing of a color chart shown in FIG. 1.
FIG. 3B is a table showing a design example of color values of respective color patches of the color chart shown in FIG. 3A.

FIG. 3A is a schematic explanatory view illustrating the basic configuration of the color chart 36c shown in FIG. 1.

The color chart 36c comprises twenty-seven color patches 50, a surrounding region 52 corresponding to a background portion that surrounds each of the color patches 50 respectively, a sequence of row numbers 54l and a sequence of column numbers 54c for identifying layout positions of the color patches 50 along directions of the rows and columns, and print information 56 for identifying printing conditions for the color chart 36c, all of which are printed on the print medium 34.

The respective color patches 50 include an F-shaped form (each having substantially the same shape). The color patches 50 are arranged respectively in three matrices disposed in respective left, central, and right areas of the print medium 34, each of the matrices including 9 color patches arranged in three horizontal rows and three vertical columns spaced by given intervals. Colors of the respective color patches 50 are set to given values in a range of signal levels of C, M, Y, K values (a percentage range from 0% to 100% or an 8-bit gradation range from 0 to 255).

The surrounding region 52 is made up from a lefthand area 52L, a central area 52C, and a righthand area 52R. In the example shown in FIG. 3A, each of the lefthand area 52L, the central area 52C, and the righthand area 52R are colored uniformly with the predetermined color.

The row numbers 54l (identifying information) are represented by (1), (0), (−1), respectively, arranged successively from above and positioned in alignment with and to the left of the respective rows of color patches 50. The column numbers 54c (identifying information) are represented by (1'), . . . , (−1"), respectively, arranged successively from the left and positioned in alignment with and above the respective columns of color patches 50. Hereinbelow, the row numbers 54l and the column numbers 54c are referred to collectively as identification numbers 54.

The print information 56 represents a type of printing machine 18, a serial number or registration name thereof, a print mode, a type of print medium 34, a print date, etc.

FIG. 3B is a table showing a design example of color values of respective color patches 50 shown in FIG. 3A.

For arranging plural color patches 50 in a two-dimensional pattern, colors of the color patches 50 are changed gradually depending on positions of the color patches 50. For example, using three variables (L*, a*, b*) of a uniform color space CIELAB, color values of each color patch 50 are determined according to the following equations (1) through (3):

$$L^*_i = L^*_0 + \Delta L^* \times i \text{ (where } i \text{ is an integer)} \quad (1)$$

$$a^*_j = a^*_0 + \Delta a^* \times j \text{ (where } j \text{ is an integer)} \quad (2)$$

$$b^*_k = b^*_0 + \Delta b^* \times k \text{ (where } k \text{ is an integer)} \quad (3)$$

Numbers added to the left and top of the table shown in FIG. 3B correspond respectively to the row numbers 54l and the column numbers 54c. The table includes a matrix of cells, each showing three numerical values in upper, middle, and lower levels. The three numerical values are represented by values of "i", "j", "k" included in the respective equations (1), (2), (3) shown above.

A typical color (e.g., central value $L^*_0$, $a^*_0$, $b^*_0$) of the color patches 50 will be referred to as a "standard color". Further, the color of the surrounding region 52 is referred to as a "region color". Moreover, the color difference ($\Delta L^*$, $\Delta a^*$, $\Delta b^*$) between adjacent color patches 50 will be referred to as a "color interval". The number of color patches 50 per matrix side (three in FIG. 3A) will be referred to as a "patch count". The associative relationship between positions of the color patches 50 and the color values shown in FIG. 3B will be referred to as a "color association". The standard color, the region color, the color interval, the patch count, and the color association of the color chart 36c will collectively be referred to as "color chart conditions".

Figure 4:
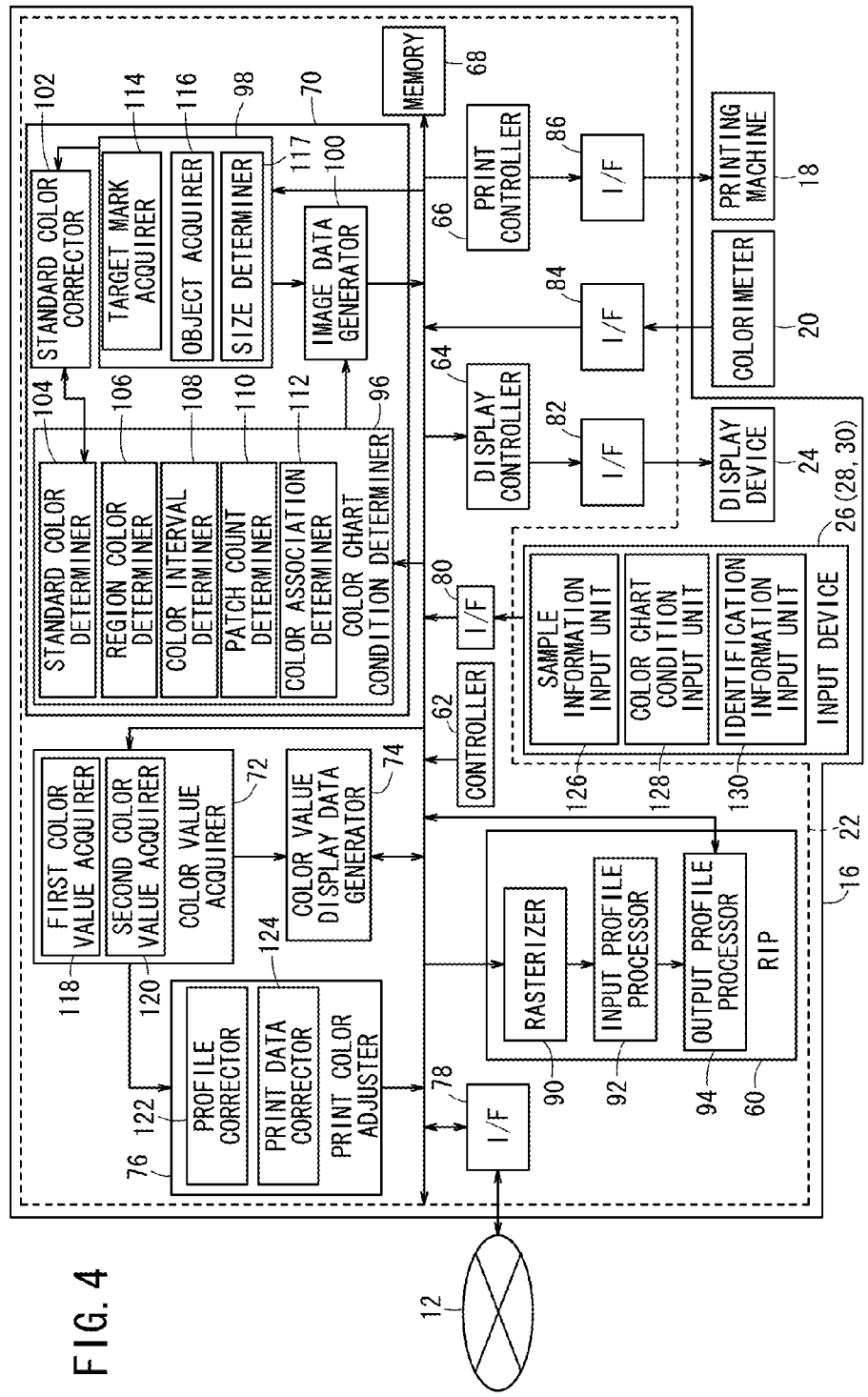
FIG. 4 is a functional block diagram of the image processing apparatus shown in FIG. 1.

FIG. 4 is a functional block diagram of the image processing apparatus 16 shown in FIG. 1.

The main unit 22 of the image processing apparatus 16 includes a RIP (Raster Image Processor) 60, a controller 62, a display controller 64, a print controller 66, a memory (recording medium) 68, a chart output data generator 70, a color value acquirer 72, a color value display data generator (data converter) 74, a print color adjuster 76, and five I/Fs 78, 80, 82, 84, 86.

The RIP 60 includes a rasterizer 90 for converting an electronic manuscript described by PDL into an electronic manuscript represented in a raster format, an input profile processor 92 for converting device-dependent data into device-independent data using an input profile, and an output profile processor 94 for converting device-independent data into device-dependent data using an output profile.

The controller 62, which may comprise a processor such as a CPU or the like, controls various components of the main unit 22, e.g., the RIP 60, the display controller 64, and the chart output data generator 70, etc.

The display controller 64 is a control circuit, which is controlled by the controller 62 to energize the display device 24. More specifically, the display controller 64 outputs display control signals via the I/F 82 to the display device 24 in order to energize the display device 24 for displaying images.

The print controller 66 is a control circuit, which is controlled by the controller 62 to energize the printing machine 18. More specifically, the print controller 66 outputs print control signals via the I/F 86 to the printing machine 18 in order to energize the printing machine 18 for producing the print 36.

The memory 68 stores therein programs and data (e.g., data required for a processing sequence performed by the chart output data generator 70), which are required for the controller 62 to control the various components. The memory 68 may comprise a recording medium such as a nonvolatile memory, a hard disk, or the like.

The chart output data generator 70 generates print data for printing the color chart 36c using the printing machine 18. Further, the chart output data generator 70 generates display data for displaying on the display device 24 a chart simulating image 202 (discussed later in relation to FIG. 8), which simulates the color chart 36c.

The format of the print data or the display data are not limited to raster data such as TIFF data or bitmap data, but may be image data in PDL format, including PDF and PostScript (registered trademark).

The chart output data generator 70 comprises a color chart condition determiner 96 for determining color chart conditions employed for printing the color chart 36c, a sample shape acquirer 98 for acquiring shapes of the target mark 46 and the object 42 extracted from the print sample 40, an image data generator 100 that generates image data for printing the color chart 36c (or displaying the chart simulating image 202), and a standard color corrector 102 for correcting the standard color of the color chart 36c responsive to the visual response characteristics of human observers.

The color chart condition determiner 96 further comprises a standard color determiner 104 for determining the standard color of the color chart 36c to be printed, a region color determiner 106 for determining the color of the surrounding region 52, a color interval determiner 108 for determining a color interval of the color patches 50, a patch count determiner 110 for determining a patch count of the color chart 36c, and a color association determiner 112 for determining a color association of the color chart 36c.

The sample shape acquirer 98 further comprises a target mark acquirer 114 for acquiring the shape of the target mark 46 extracted from within the print sample 40, an object acquirer 116 for acquiring the shape of an extracted object 42, and a size determiner 117 for determining a data region size for each of the color patches 50 corresponding to the output resolution of the print sample 40.

The color value acquirer 72 includes a first color value acquirer 118 for acquiring first color values of a color patch 50, which is ultimately selected from the color chart 36c, as first color values (also referred to as "selected color values"), and a second color value acquirer 120 for acquiring color values of a designated color as second color values.

The color value display data generator 74 generates various data for displaying the respective color values acquired by the color value acquirer 72. As color values that are displayed, there may be included device-independent data and/or device-dependent data (first color values, second color values), etc., depending on the color patches 50, colors of which are reproduced by the printing machine 18.

The print color adjuster 76 includes a profile corrector 122 for correcting a color conversion table defined by the profile of the printing machine 18 into a new profile, and a print data corrector 124 for correcting portions of an electronic manuscript into suitable color values.

The input device 26 functions as a sample information input unit 126 for entering various information pertaining to the print sample 40, via a color selection screen image 200 (see FIGS. 8 through 10) to be described later. The input device 26 also functions as a color chart condition input unit 128 for entering color chart conditions, via the color selection screen image 200 etc. The input device 26 also functions as an identification information input unit 130 for entering identification numbers 54 of the color patches 50, via the color selection screen image 200 etc. Identification information of the color patches 50 may comprise information for uniquely identifying each of the color patches 50 on the color chart 36c, and may be any of various types. Identification information of the color patches 50 includes layout information (identification codes, positional relationships, etc.), or color information (color values obtained by colorimetry, etc.) of the color patches 50.

The image processing apparatus 16 according to the present embodiment is constructed basically as described above. Various image processing functions referred to above are realized by application software (programs) stored in the memory 68, such programs operating under the control of basic software (operating system).

Programs may be recorded in a computer-readable recording medium (e.g., the portable memory 32 shown in FIG. 1), and may be read into a computer system and executed thereby. The term "computer system" includes an operating system (OS) and hardware including peripheral devices. The computer-readable recording medium comprises a portable medium made up of a storage device such as a flexible disk, a magnetooptical disk, a ROM, a CD-ROM, or the like, or a storage unit such as a hard disk or the like incorporated into the computer system. The computer-readable recording medium may also include a medium for dynamically holding programs for a short period of time, such as a communication line for transmitting programs via a network such as the Internet or the like, a communication channel such as a telephone line, or a memory for holding programs for a certain period of time, such as a volatile memory in a computer system that serves as a server or a client in a network environment.

The printing system 10 according to the present embodiment is constructed basically as described above. Operations of the printing system 10 will be described below with reference to the flowchart shown in FIG. 5 and the functional block diagram shown in FIG. 4.

First, the operator determines printing conditions for the print 36 (step S1). Printing conditions refer to the type of printing machine 18 used to produce the print 36, the type of print medium 34, the print mode, etc.

Then, the operator obtains the print sample 40 shown in FIG. 2 (step S2). At this time, a client (one who relies on the print worker) instructs the operator (print worker) to reproduce with high precision a color of the logo mark (target mark 46) made up from the character "F" that resides within the print sample 40. At this time, the color of the target mark 46 on the print sample 40 corresponds to the designated color.

Then, the operator makes fine adjustments to colors of the print 36 to be printed (step S3). Detailed operations of the image processing apparatus 16 will be described later.

Then, the operator enters a prescribed command via the input device 26 to control the printing machine 18 to print the print 36 (step S4). An image processing sequence of the image processing apparatus 16 will be described below with reference to the functional block diagram shown in FIG. 4.

The image processing apparatus 16 receives an electronic manuscript (PDL format) supplied from the editing apparatus 14 via the network 12 and the I/F 78. The electronic manuscript is represented by a page description language (PDL), which describes the print sample 40.

The rasterizer 90 converts data of the electronic manuscript (PDL format) received from the editing apparatus 14 into device-dependent data in raster format (e.g., 8-bit C, M, Y, K values). The input profile processor 92 converts the device-dependent data acquired from the rasterizer 90 into device-independent data (e.g., L*, a*, b* values). The output profile processor 94 converts the device-independent data acquired from the input profile processor 92 into device-dependent data (e.g., C, M, Y, K values). The print controller 66 converts the device-dependent data acquired from the output profile processor 94 into print control signals (ink propulsion control data). The print controller 66 then outputs print control signals via the I/F 86 to the printing machine 18 in order to control the printing machine 18 to print the desired print 36.

Figure 5:
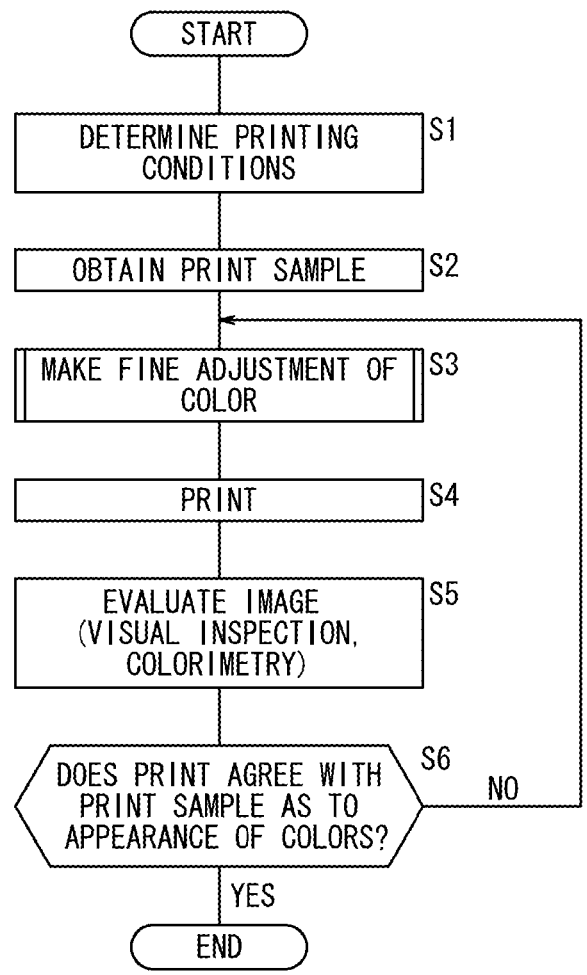
FIG. 5 is a flowchart of a sequence for producing a print of an appropriate color with the printing system shown in FIG. 1.

As shown in FIG. 5, the operator evaluates colors of the produced print 36 (step S5). The operator determines whether or not the appearance of target marks 46 on the print 36 and target marks 46 (an image region of a designated color) on the print sample 40 agree with each other (step S6). More specifically, the operator evaluates the appearance of colors according to a process of judging such colors through visual inspection of an overall or partial outlook of the image, or a process of determining whether or not colorimetric values of a certain area of the print 36, as measured by the colorimeter 20, fall within a desired range.

If the operator judges that the appearance of colors in the given printed region of the print 36 and the print sample 40 are not in agreement with each other, then the operator makes fine adjustments to the colors of the print 36 that is printed (step S3). Printing and evaluation of colors are repeated (steps S3 through S6) until a print 36 having desired colors can be produced.

Figure 6:
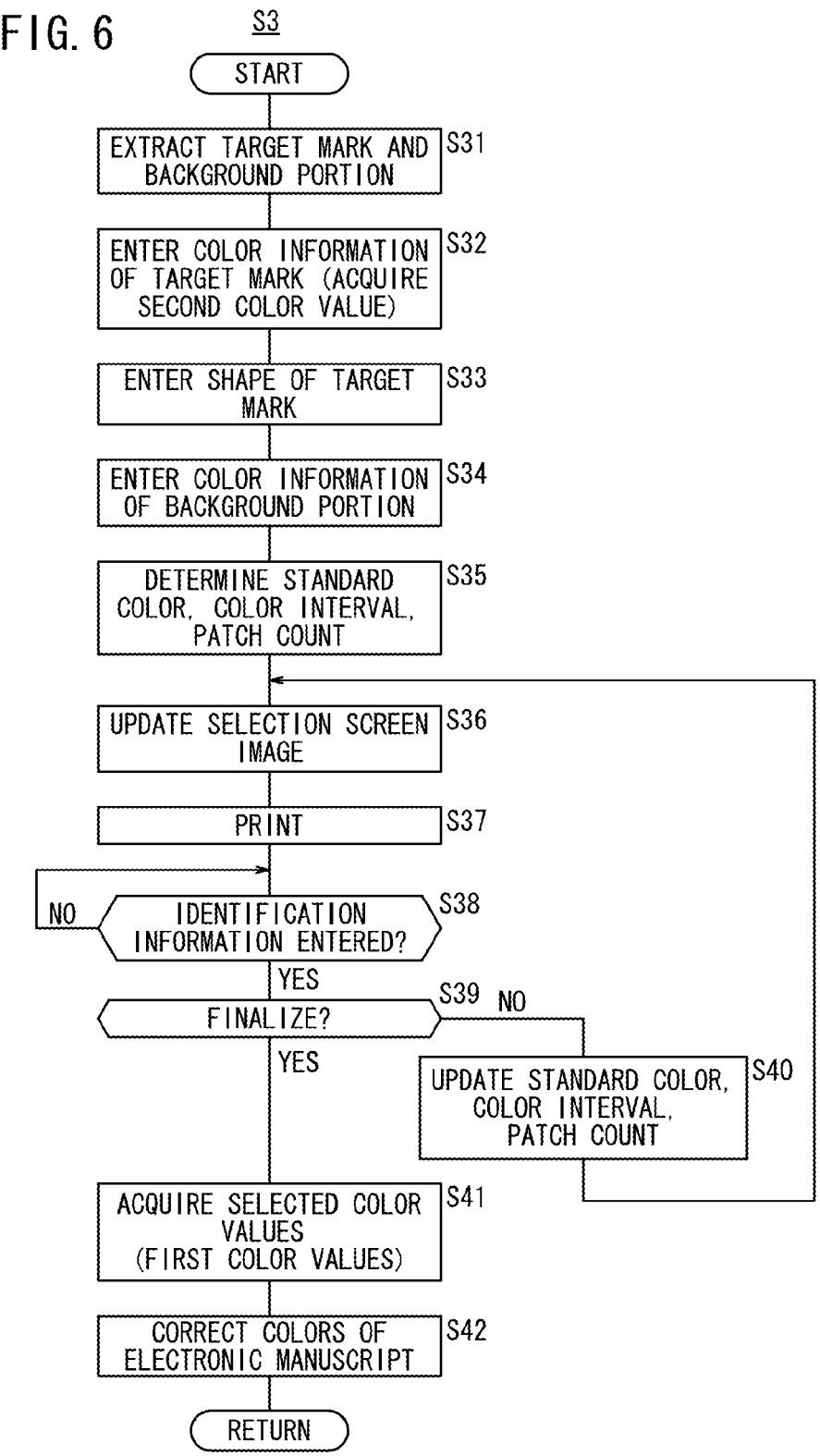
FIG. 6 is a flowchart of an operation sequence of the image processing apparatus shown in FIG. 1, during a fine color adjusting step (step S3) shown in FIG. 5.

An operation sequence of the image processing apparatus 16 of FIGS. 1 and 4 for making fine adjustments to colors of the print 36 to be printed (step S3 of FIG. 5) will be described in detail below with reference to the flowchart shown in FIG. 6.

First, from within the print sample 40, the target mark 46 and the background portion 48 are extracted (step S31). The target mark 46 and the background portion 48 of FIG. 2 are respective image regions that are extracted from the target region 44. For example, such image regions can be extracted by defining border lines or the like in the print sample 40. Alternatively, by displaying an image of the print sample 40 on the display device 24, and by the operator performing a prescribed operation, the range of the image region can be clipped.

By carrying out known image processing (e.g., threshold processing) with respect to the clipped image region, the target mark 46 and the background portion 48 can be extracted. As one example of threshold processing, a region may be extracted for which the color difference Δe from the average color value of the clipped image region is 5 or less.

In response to a prescribed action made by the operator, the image processing apparatus 16 enters color information of the target mark 46 (step S32).

The color information comprises various types of information for specifying color, and includes not only the original color sample, but color values and types thereof. The color value of the color sample may include device independent or device dependent data. The type of color sample may include a manufacturer name, a color sample number, etc.

Figure 7:
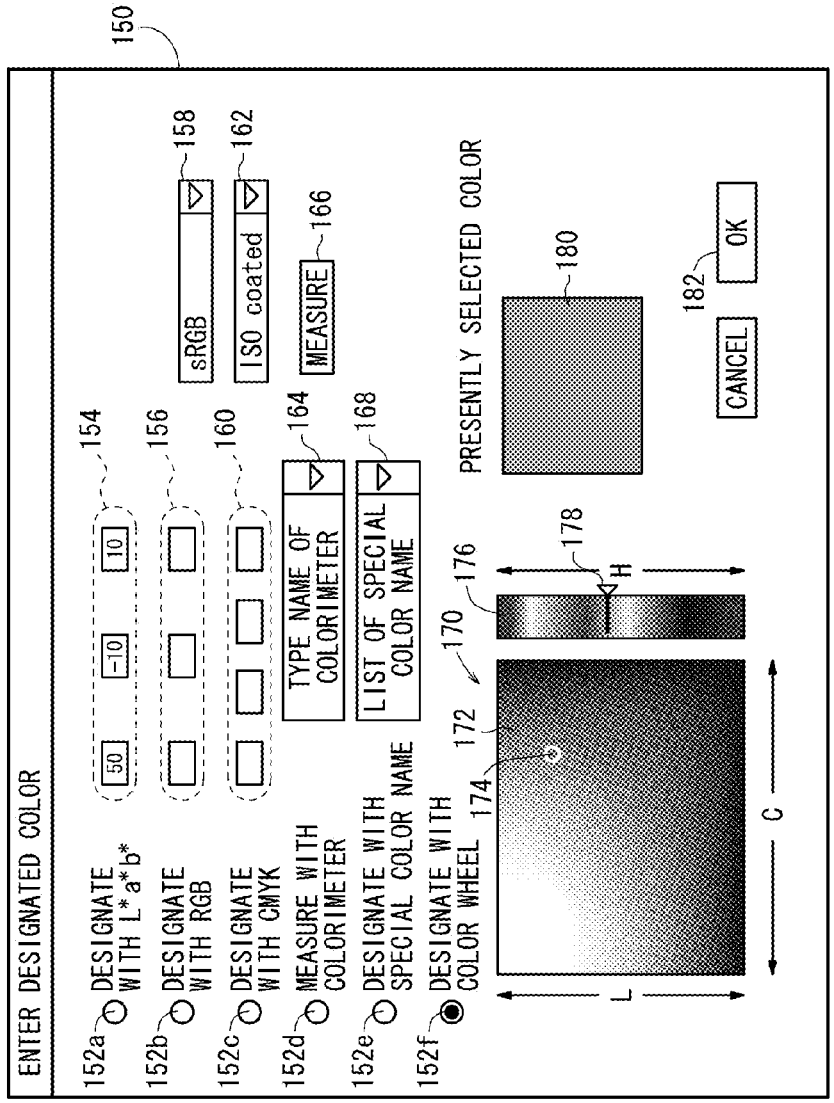
FIG. 7 is a view showing by way of example a screen image for entering color information of a designated color.

Prior to the aforementioned input operation, the display controller 64 (see FIG. 4) controls the display device 24 in order to display an input screen image 150 shown in FIG. 7.

The operator selects one of a plurality of processes (six processes in FIG. 7) for entering color information of a designated color. More specifically, the operator clicks with the mouse 30 (see FIG. 1) one of radio buttons 152a through 152f on the input screen image 150, which is displayed by the display device 24.

The radio button 152a corresponds to "DESIGNATE WITH L*a*b*", which represents a process of directly entering known L*, a*, b* values of a designated color. More specifically, using the keyboard 28 (see FIG. 1), the operator enters the L*, a*, b* color values into three text boxes 154 successively from the left.

The radio button 152b corresponds to "DESIGNATE WITH RGB", which represents a process of directly entering known R, G, B values of a designated color. More specifically, using the keyboard 28, the operator enters R, G, B color values into three text boxes 156 successively from the left. Then, using a pull-down menu 158, the operator selects a suitable target profile (e.g., "sRGB" in FIG. 7) depending on the purpose of the print. The main unit 22 then converts the R, G, B color values (which were entered in the text boxes 156) into L*, a*, b* values according to RGB-L*a*b* conversion formulas corresponding to the selected target profile.

The radio button 152c corresponds to "DESIGNATE WITH CMYK", which represents a process of directly entering known C, M, Y, K values of a designated color. More specifically, using the keyboard 28, the operator enters C, M, Y, K color values into four text boxes 160 successively from the left. Then, using a pull-down menu 162, the operator selects a suitable target profile (e.g., "ISO coated" in FIG. 7) depending on the purpose of the print. The main unit 22 then converts the C, M, Y, K color values (which were entered in the text boxes 160) into L*, a*, b* values according to CMYK-L*a*b* conversion formulas corresponding to the selected target profile.

The radio button 152d corresponds to "MEASURE WITH COLORIMETER", which represents a process of measuring a color sample such as a color chip or the like with the colorimeter 20, and entering L*, a*, b* values. More specifically, the operator sets a color sample in a state such that the color sample can be measured by the colorimeter 20. Then, using the mouse 30, the operator enters the type name of the colorimeter 20 through a pull-down menu 164, and clicks on a "MEASURE" button 166. The main unit 22 acquires color values from the colorimeter 20 via the I/F 84 (see FIG. 4).

The radio button 152e corresponds to "DESIGNATE WITH SPECIAL COLOR NAME", which represents a process of referring to special color names (selectable by a pull-down menu 168) stored and managed in the memory 68 or the database DB, and acquiring L*, a*, b* values, which correspond to a selected special color name.

The radio button 152f corresponds to "DESIGNATE WITH COLOR WHEEL", which represents a process of acquiring L*, a*, b* values using a color wheel 170. More specifically, the operator drags the mouse 30 to move a ring pointer 174 on a color pallet 172, to thereby change designated colors depending on chromaticity (C) values, as a variable on the horizontal axis of the color pallet 172, and lightness (L) values thereof, as a variable on the vertical axis of the color pallet 172. Alternatively, the operator drags the mouse 30 to vertically move a triangular pointer 178 along a color bar 176, to thereby change designated colors depending on a hue (H) value thereof, as a variable on the vertical axis of the color bar 176. A rectangular reference patch 180 may display a color, which is the same as the color that is currently indicated by the ring pointer 174 and the triangular pointer 178.

When the operator clicks on an "OK" button 182, the main unit 22 enters color information of the designated color and acquires L*, a*, b* values depending on the color information.

Then, in response to a prescribed action made by the operator, the image processing apparatus 16 enters the shape of the target mark 46 (step S33). Prior to such an entry operation, the display controller 64 controls the display device 24 to display the color selection screen image 200 shown in FIG. 8.

The color selection screen image 200 includes, in an upper central portion thereof, the chart simulating image 202 (simulative image), which simulates the layout of the color patches 50 on the color chart 36c.

The color selection screen image 200 also includes a horizontally extending color bar 204 displayed above the chart simulating image 202. A continuous gradation of colors is displayed thereby, such that L* values thereof increase linearly over horizontal positions on the color bar 204 from a right end to a left end of the color bar 204. Further included is a vertically extending color bar 206, which is displayed to the left of the chart simulating image 202, in a continuous gradation of colors such that b* values thereof increase linearly from a lower end to an upper end thereof. Further included is a horizontally extending color bar 208, which is displayed beneath a left portion of the chart simulating image 202, in a continuous gradation of colors such that a* values thereof increase linearly from a left end to a right end thereof.

The chart simulating image 202 includes twenty-seven patch images 210, and a background image 212 surrounding each of the patch images 210, respectively.

The color selection screen image 200 also includes a setting field 214 displayed below the chart simulating image 202, for allowing displayed details to be freely changed if given tabs are clicked on. To the right of the setting field 214, buttons 216, 218, 220, 222, 224 are displayed, indicated respectively from above by the terms, "UPDATE STANDARD COLOR", "PRINT", "FINALIZE", "RETURN" and "CANCEL".

The operator, via the setting field 214, enters the shape of the target mark 46, upon selecting either one of a "TEXT INPUT" or an "IMAGE INPUT" method.

In the case of text input, the operator, using the mouse 30, selects and clicks on radio button 226a from among the radio buttons 226a, 226b. Additionally, the operator, using the keyboard 28 and the mouse 30, enters a character (the character "F" in the example of FIG. 8) into a text box 228, enters a font ("MS Gothic" in the example of FIG. 8) via a pull-down menu 230, enters a style ("BOLD" in the example of FIG. 8) via a pull-down menu 232, and enters a size ("36 point" in the example of FIG. 8) via a pull-down menu 234. Upon doing so, in accordance with the various settings that are presently input, the shape "F" is displayed immediately within a preview field 236.

In the case of image input, the operator, using the mouse 30, selects and clicks on the radio button 226b from among the radio buttons 226a, 226b. Additionally, the operator enters a file name into a text box 238. Upon doing so, image data of the input file name is displayed immediately within the preview field 236. Moreover, input of the file name may be directly performed using the keyboard 28, or may be carried out by clicking on a "LOOK UP" box 240 using the mouse 30, and making a selection from the predetermined window. Further, a file may be generated ahead of time made up of image data in which a portion (i.e., the location of the target mark 46) of the print data of the print sample 40 is clipped, and this file may be read.

Then, responsive to a predetermined operation by the operator, the image processing apparatus 16 enters color information of the background portion 48 (step S34). Following step S33, the display controller 64 causes the color selection screen image 200 shown in FIG. 9 to be displayed on the display device 24.

Figure 8:
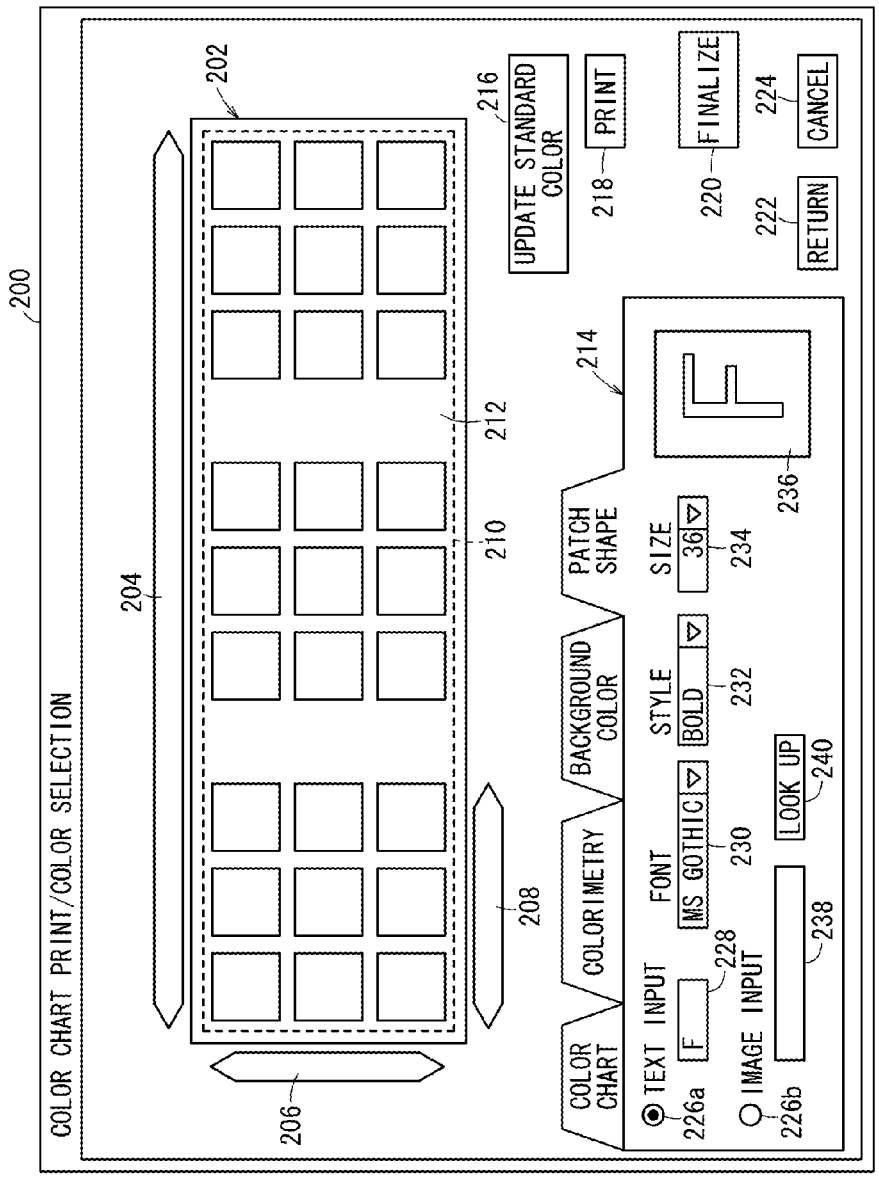
FIG. 8 is a view showing by way of example a color chart printing and color selection screen image.
Figure 9:
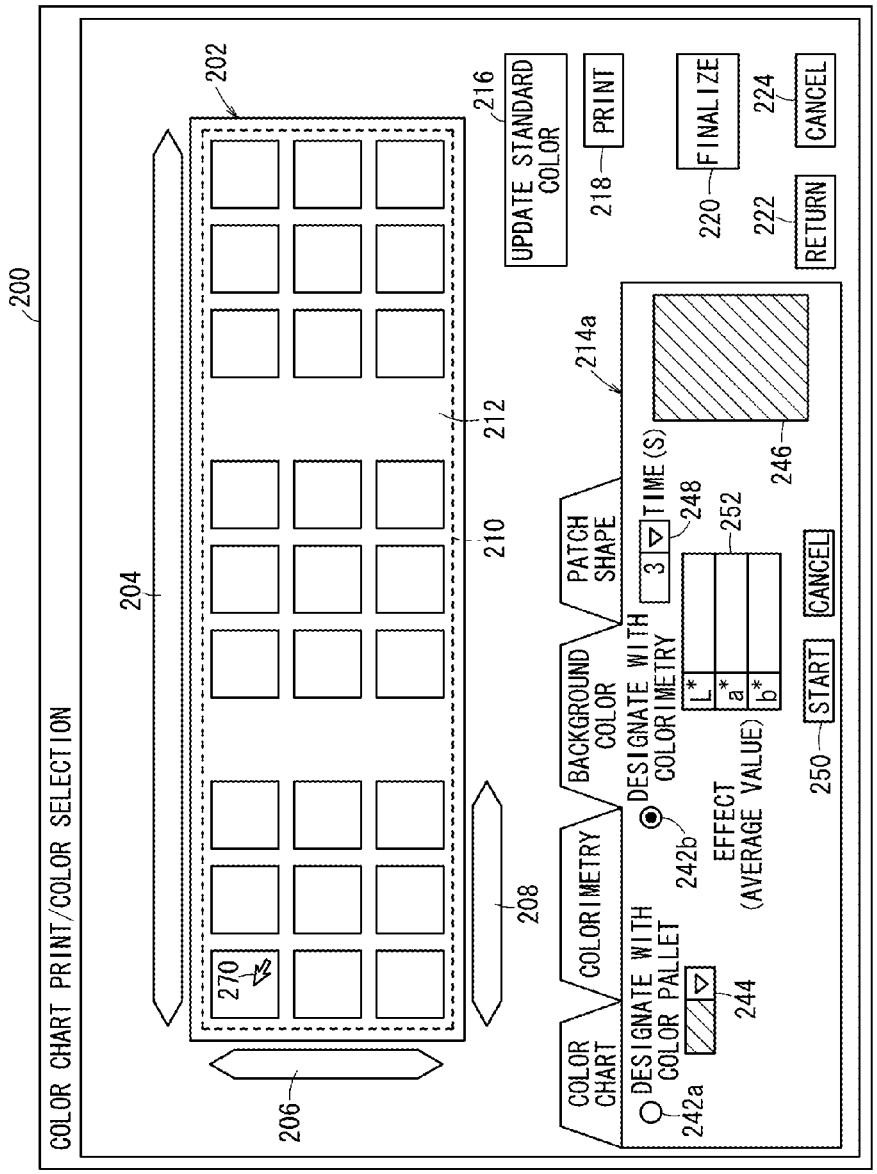
FIG. 9 is a view showing a first modification of the color selection screen image shown in FIG. 8.

FIG. 9 is a view showing a first modification of the color selection screen image 200 shown in FIG. 8. The operator, by clicking on a tab at an upper portion of the setting field 214 (see FIG. 8), causes the display controller 64 to change the display format within the setting field 214. In this case, reference numeral 214a indicates a setting field of the new display format.

Via the setting field 214a, the operator selects either of the methods, "DESIGNATE WITH BY COLOR PALLET" or "DESIGNATE WITH COLORIMETRY", whereupon color information of the background portion 48 is entered.

In the case of setting by color pallet, the operator, using the mouse 30, selects and clicks on a radio button 242a from among the radio buttons 242a, 242b. Additionally, the operator, using the mouse 30, selects and enters a color, which is closest to the print sample 40, from among a color grouping capable of being selected from a color pallet 244. Upon doing so, the entered color (the color presently displayed by the color pallet 244) is displayed immediately within a preview field 246.

In the case of setting by colorimetry, the operator, using the mouse 30, selects and clicks on the radio button 242b from among the radio buttons 242a, 242b. Additionally, the operator enters the number of times that colorimetry is to be performed ("3" in the example of FIG. 9) by a pull-down menu 248, sets the colorimeter 20 in a state enabling colorimetric measurement of the print sample 40, and clicks on a "START" button 250. Also, the operator, similar to the example of FIG. 2, performs respective colorimetric measurements with respect to three locations (positions P1 through P3) within the background portion 48. With each colorimetric measurement, respective color values from the colorimeter 20 are displayed in a field 252, together with displaying immediately in the preview field 246 the color corresponding to the color values.

In the event that colorimetric measurements are carried out multiple times, using the color values acquired each time, color values calculated by a statistical technique may be displayed. By using such a statistical technique, variances in color values due to differences in the colorimetric measurement position, the equipment used, and the like can be lessened. More specifically, not only average values, but also various calculation methods such as median, mode, weighted average, and the like can be utilized.

Methods for entering color information of the background portion 48 are not limited to the above-described methods. Color information can also be entered through application of the various methods shown in FIG. 7. Next, responsive to an operation by the operator, the image processing apparatus 16 determines a standard color, a color interval, and a patch count (step S35). Following step S34, the display controller 64 causes the color selection screen image 200 shown in FIG. 10 to be displayed on the display device 24.

Figure 10:
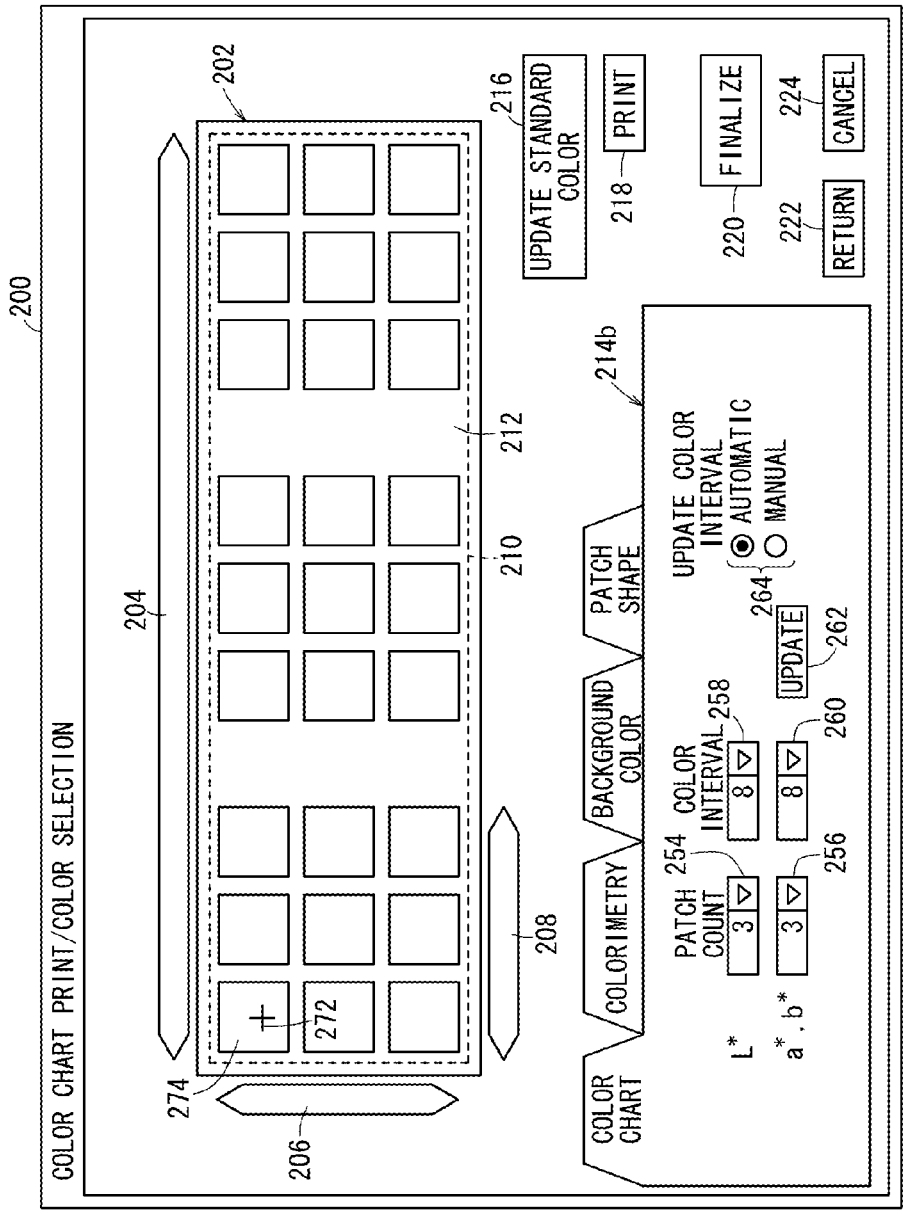
FIG. 10 is a view showing a second modification of the color selection screen image shown in FIG. 8.

FIG. 10 is a view showing a second modification of the color selection screen image 200 shown in FIG. 8. The operator, by clicking on a tab at an upper portion of the setting field 214a (see FIG. 9), causes the display controller 64 to change the display format within the setting field 214a. In this case, reference numeral 214b indicates a setting field of the new display format.

The operator enters a patch count ("3" in FIG. 10) for the L* axis through a pull-down menu 254 in the setting field 214b, and enters a patch number ("3" in FIG. 10) for the a* axis and the b* axis through a pull-down menu 256. The operator also enters a color interval (color difference Δe="8" in FIG. 10) for the L* axis through a pull-down menu 258, and enters a color interval (color difference Δe="8" in FIG. 10) for the a* axis and the b* axis through a pull-down menu 260.

Then, the display controller 64 updates and displays the color selection screen image 200 (step S36). Responsive to a clicking operation on an "UPDATE" button 262 (see FIG. 10), the color chart condition determiner 96 of FIG. 4 acquires presently set color chart conditions from the color chart condition input unit 128 via the I/F 80.

The standard color determiner 104 determines the standard color of the chart simulating image 202 to be displayed. The region color determiner 106 determines the color of the background image 212 of the chart simulating image 202. The color interval determiner 108 determines the color interval of the chart simulating image 202. The patch count determiner 110 determines the patch count of the chart simulating image 202. The color association determiner 112 determines an associative relationship between colors and positions of each of the patch images 210 in the chart simulating image 202.

Thereafter, the image data generator 100 generates display data for displaying the chart simulating image 202, based on the color chart conditions acquired from the color chart condition determiner 96, and supplies the display data to the display controller 64. The display controller 64 outputs the display data via the I/F 82, and causes the color selection screen image 200 (chart simulating image 202) to be displayed on the display device 24.

In this manner, on the color selection screen image 200 of FIGS. 8 through 10, according to the presently entered color chart conditions, the display colors and count of the patch images 210 within the chart simulating image 202 are quickly updated and displayed (step S36).

Then, the operator enters a prescribed command in order to instruct the printing machine 18 to print the color chart 36c (step S37).

In response to the operator clicking on the "PRINT" button 218 (see FIGS. 8 through 10), the color chart condition determiner 96 of FIG. 4 acquires the presently set color chart conditions from the color chart condition input unit 128 via the I/F 80.

More specifically, the standard color determiner 104 determines the values that were entered via the input screen image 150 as standard colors of the color patches 50. The region color determiner 106 determines the input value (the color of the preview field 246 in FIG. 9) input via the setting field 214a as the region color of the color chart 36c. The color interval determiner 108 determines the values entered in the setting field 214b (pull-down menus 258, 260 shown in FIG. 10) as a color interval of the color patches 50. The patch count determiner 110 determines the values entered in the setting field 214b (pull-down menus 254, 256 shown in FIG. 10) as a patch count of the color chart 36c. The color association determiner 112 determines a color association between the layout and colors of the color patches 50 on the color chart 36c (see FIG. 3B).

The target mark acquirer 114 acquires the shape (the shape displayed in the preview field 236 of FIG. 8) entered by the color selection screen image 200 as the shape of the target mark 46. The size determiner 117 determines the data region size for each of the color patches 50 corresponding to the output resolution of the print sample 40. The size determiner 117, for example, determines the data region size, such that the size of the square shaped color patches 50 shown in FIG. 3A are of a constant value irrespective of output resolution.

On the other hand, the standard color corrector 102 corrects as necessary the standard color acquired from the standard color determiner 104, and supplies the corrected standard color (color value) back to the standard color determiner 104. The standard color corrector 102 corrects the standard color corresponding to a difference between the size of the color patches 50 and the size of the target mark 46. During such correction, for example, the area effect, the Von Bezold effect (assimilation phenomenon), etc., are taken into consideration. Further, the standard color corrector 102 may correct the standard color corresponding to a combination of colors of the target mark 46 and the background portion 48. During such correction, for example, a brightness contrast effect, saturation contrast effect, hue contrast effect, complementary color contrast effect, or the like are taken into consideration. Furthermore, the standard color corrector 102 may correct the standard color while comprehensively considering the aforementioned visual effects.

The image data generator 100, using the region color acquired from the color chart condition determiner 96, determines the color value inside the surrounding region 52 of the color chart 36c. Thereafter, the image data generator 100, using the patch count acquired from the color chart condition determiner 96 and the shape of the target mark 46 and the data region size acquired from the sample shape acquirer 98, determines address data corresponding to positions of each of the color patches 50. Thereafter, the image data generator 100, using the standard color, the color interval, and the color association acquired from the color chart condition determiner 96, determines the color values within each of the color patches 50.

Based on the color value inside the surrounding region 52 and the addresses and color values of each of the color patches 50, the image data generator 100 generates print data for printing the color chart 36c, and supplies the print data to the RIP 60. If the print data are PDL-format data, then the RIP 60 instructs the rasterizer 90 and the output profile processor 94 to process the print data. Alternatively, if the print data are raster-format data, then the RIP 60 instructs the output profile processor 94 to process the print data.

In addition, the RIP 60 implements an appropriate process with respect to the print data, and after processing thereof, supplies the print data to the print controller 66. The print controller 66 outputs the processed print data via the I/F 86 to the printing machine 18, and controls the printing machine 18 to print the color chart 36c (see FIG. 3A).

Referring back to FIG. 6, the image processing apparatus 16 determines whether identification information of the color patches 50 has been entered or not (step S38). The image processing apparatus 16 repeats step S38 until the operator has entered appropriate input instructions therefor.

The operator compares and evaluates the color chart 36c printed in step S37 with the print sample 40 (target region 44), which is to be reproduced by the printing machine 18. Then, from the color chart 36c, the operator selects a color patch 50 closest in color to the target mark 46. For example, the operator may select a color patch 50 based on a subjective view acquired through visual comparative observation. Alternatively, the operator may directly measure the color patches 50 using the colorimeter 20, and select a color patch 50 having a color that the operator thinks is closest to the designated color, based on color values obtained by the colorimeter 20.

The "color closest to the designated color" referred to herein is judged according to subjective or objective standards. As a result, no issue is raised concerning whether or not the operator has been able to select a color patch 50 the color difference of which from the color sample (designated color) is minimum.

For example, as shown in FIG. 9, a clicking operation is carried out with the mouse 30, under a condition in which a pointer 270 is positioned inside the chart simulating image 202. Upon doing so, as shown in FIG. 10, a cross-shaped mark 272 is displayed in a superimposed fashion at the designated position of the pointer 270. At this time, one of patch images 274 {color patch 50 of row number 541 (1), column number 54c (1')} is displayed as being presently selected.

With the color selection screen image 200 of FIGS. 8 through 10, the patch image 210 is displayed in a rectangular shape. However, the patch image 210 may be displayed so as to be in conformity with the shape of the color patches 50 (e.g., "F" shaped characters in the example of FIG. 3A).

Further, the identification information may be of any type, so long as it is information that enables the respective color patches disposed on the color chart 36c to be identified uniquely. Such identification information includes layout information (identification number 54, etc.), or color information (color values obtained by colorimetry, etc.) of the color patches 50.

Furthermore, if the color of a color patch 50 is closely approximate in color to the designated color, then only one color patch 50 may be selected. Alternatively, an intermediate color between adjacent color patches 50 may be entered using a GUI control object, such as a color wheel or the like. If the colors represented by any of the twenty-seven color patches 50 are not pertinent, then the operator may decide that the designated color is not within the range of the twenty-seven color patches 50, and may make a selection reflecting that decision. Furthermore, by means of a text box or the like, the operator may directly enter a color sample number, color values, or the like, corresponding to the color of a selected color patch 50.

While designating with the mark 272 a given location inside the chart simulating image 202, the operator clicks on either one of the "UPDATE STANDARD COLOR" button 216 or the "FINALIZE" button 220 (see FIGS. 8 through 10). Then, control proceeds to the next step S39. If the operator wishes to finalize the color and end the selection process, then the operator clicks on the "FINALIZE" button 220. If the operator does not wish to finalize the color, then the operator clicks on the "UPDATE STANDARD COLOR" button 216.

Returning to FIG. 6, the image processing apparatus 16 determines whether a color has been finalized or not (step S39). If the image processing apparatus 16 judges that a color has not been finalized, i.e., if the image processing apparatus 16 accepts clicking on the "UPDATE STANDARD COLOR" button 216, then the color chart condition determiner 96 acquires color chart conditions from the color chart condition input unit 128, and updates values of the standard color, the color interval, and the patch count (step S40). At this time, the color chart condition determiner 96 may update values of the standard color, the color interval, and the patch count, while considering the identification number 54 (identification information), which has been entered from the identification information input unit 130.

Thereafter, the color selection screen image 200 of FIGS. 8 through 10 is updated (step S36), and then steps S36 through S40 are repeated.

Then, the operator prints a color chart 36c and selects a color patch 50 at least once (steps S36 through S40). If a color is finalized, then control proceeds to the next step S41. Color values of a color patch 50, which has been finally selected (finalized) in steps S31 through S40, correspond to the selected color values (first color values).

Then, the first color value acquirer 118 acquires the selected color values as first color values (step S41). When the operator clicks on the "FINALIZE" button 220 displayed in the color selection screen image 200 (see FIGS. 8 through 10), the first color value acquirer 118 acquires the identification number 54 and the color chart conditions from the identification information input unit 130 via the I/F 80. Then, the first color value acquirer 118 calculates and acquires color values (selected color values) depending on the finally selected color patch 50, based on the standard color, the color interval, the color association, and the identification number 54.

The first color value acquirer 118, similar to the calculation process carried out by the standard color corrector 102, may correct the acquired first color value as needed. The first color value acquirer 118 may correct the first color value, corresponding to a difference in the size of the color patches 50 and the size of the target mark 46, or may correct the first color value corresponding to a combination of colors of the target mark 46 and the background portion 48.

At the same time, the second color value acquirer 120 acquires a color value, which has been entered as a designated color through the input screen image 150 (see FIG. 7), as a second color value. The second color value may be either device-dependent data or device-independent data.

Finally, the image processing apparatus 16 corrects colors of the electronic manuscript (step S42).

A first correction process for replacing given color values of the electronic manuscript (print data) with appropriate color values will be described below. After step S41, the color value display data generator 74 acquires first color values and second color values from the color value acquirer 72, and also acquires the profile of the printing machine 18 from the memory 68 or the like. The color value display data generator 74 then generates various data (device-independent data and/or device-dependent data) for displaying on the display device 24 color information suitable for reproducing colors using the printing machine 18.

Figure 11:
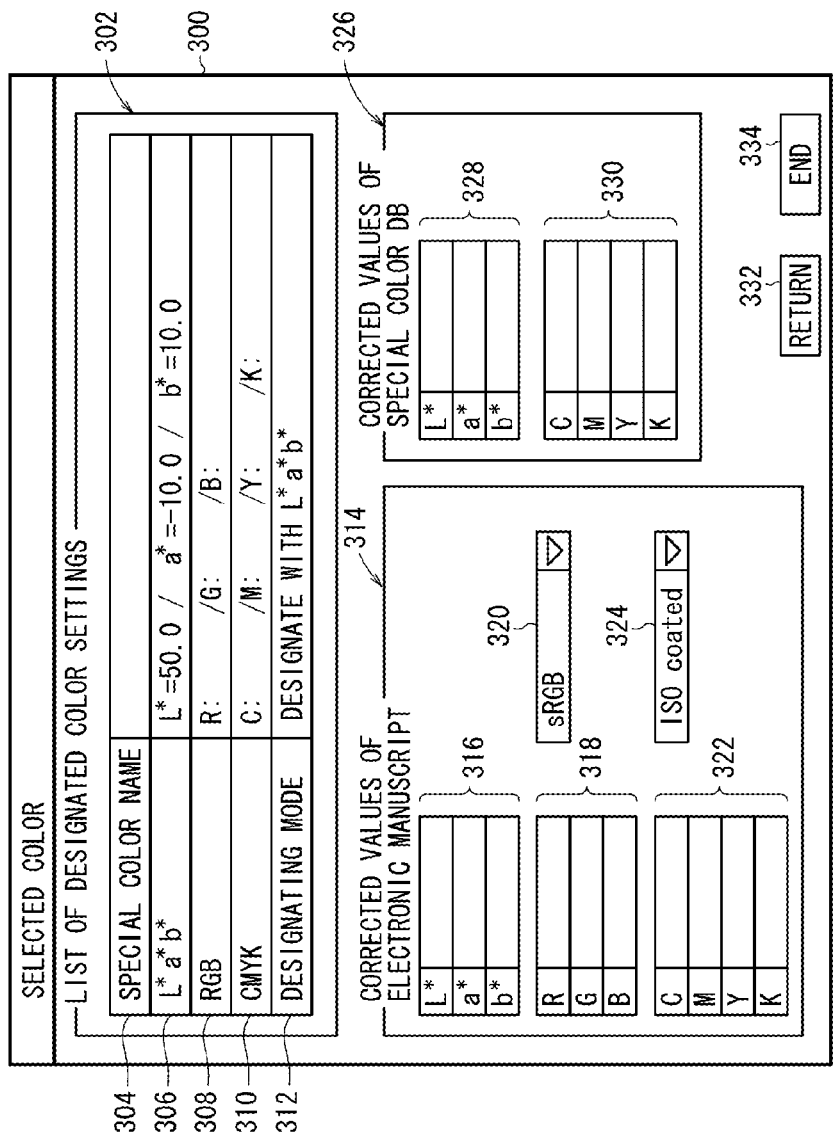
FIG. 11 is a view showing by way of example a color selection result display screen.

Then, the display controller 64 controls the display device 24 to display a result screen image 300, which displays the selected color (including the various data discussed above) as shown in FIG. 11.

The operator can correct colors of the electronic manuscript while referring to the color information displayed in the result screen image 300.

The result screen image 300 includes a field 302 in an upper area thereof for displaying color information (including a second color value) of the designated color, which has been entered via the input screen image 150 (see FIG. 7).

For example, if a special color name is entered via the pull-down menu 168 shown in FIG. 7, then the entered special color name is displayed in a cell 304. L*, a*, b* values, which correspond to the special color name, are displayed in a cell 306. R, G, B values, which correspond to the special color name, are displayed in a cell 308. C, M, Y, K values, which correspond to the special color name, are displayed in a cell 310. The method of designating color values, i.e., "DESIGNATE WITH SPECIAL COLOR NAME", is displayed in a cell 312.

The result screen image 300 includes a field 314 in a lower left area thereof for displaying color values (corrected values of an electronic manuscript) for reproducing the designated color with the printing machine 18.

For example, the first color values (device-independent data), i.e., L*, a*, b* values, are displayed as selected color values in a set of cells 316.

Values produced when the first color values are converted into device-dependent data using a desired profile, i.e., R, G, B values, are displayed in a set of cells 318. In response to selection of a profile via the pull-down menu 158 (see FIG. 7), the color value display data generator 74 converts the first color values into R, G, B values according to an L*a*b*-RGB conversion table included in the profile. The produced R, G, B values are displayed immediately in the set of cells 318 of the field 314. A profile may be selected again using a pull-down menu 320, which is displayed to the right of the cells 318.

Furthermore, values produced when first color values are converted into device-dependent data using a desired profile, i.e., C, M, Y, K values, are displayed in a set of cells 322. In response to selection of a profile via the pull-down menu 162 (see FIG. 7), the color value display data generator 74 converts the first color values into C, M, Y, K values according to an L*a*b*-CMYK conversion table included in the profile. The produced C, M, Y, K values are displayed immediately in the set of cells 322. A profile may be selected again using a pull-down menu 324, which is displayed to the right of the cells 322.

The result screen image 300 also includes a field 326 in a lower right area thereof for displaying corrected values of a special color database. For example, first color values (device-independent data), which serve as selected color values, i.e., L*, a*, b* values, are displayed respectively in a set of cells 328. Values produced when the first color values are converted into device-dependent data using the profile entered through the pull-down menu 162 (see FIG. 7), i.e., C, M, Y, K values, are displayed in a set of cells 330.

Management information (L*, a*, b* values or C, M, Y, K values) of the special color database, which is stored in the image processing apparatus 16 or in an apparatus external to the image processing apparatus 16, e.g., the database DB, may be updated automatically or manually to produce the corrected values referred to above. Colors of the print 36 can be adjusted using the updated special color data.

Further, according to a second correction process, a color conversion table included in a profile may be corrected. More specifically, the profile corrector 122 acquires from the color value acquirer 72 the first color values, which are selected and acquired as representing a color that is closest to the designated color, and the second color values representing the color values of the designated color. The profile corrector 122 then corrects the color conversion table, based on differences between the first color values and the second color values, thereby correcting the profile.

Fine adjustment of colors of the print 36 is now completed (step S3).

In the foregoing manner, the shape of the target mark 46 extracted from the print sample 40 including the designated color that is to be reproduced by printing is entered, and the color chart 36c is printed, which comprises a plurality of color patches 50 in which the shape of the entered target mark 46 is simulated. Therefore, from within the color chart 36c, which resembles the rendered content of the print sample 40, a color patch 50 having a color that is close to the designated color can be selected. More specifically, even in the event that the target mark 46 is of a complex shape, the influence of visual effects caused by differences in the shape of the target mark 46 can be reduced, and thus, work efficiency upon performing color adjustments can be improved.

The concept of "making the shape of the target mark 46 in conformity with the shape of the color patches 50" includes as a matter of course a case in which the target mark 46 and the color patches 50 are of the same shape (same size), but also may include similar shapes although the sizes thereof are different, or shapes that are substantially the same (or similar).

Further, color information of the background portion 48 of the target mark 46 is entered, and based on the color information of the background portion 48, the color of the surrounding region 52, which surrounds the multiple color patches 50 respectively, is determined. Therefore, the influence of visual effects such as a brightness contrast effect, saturation contrast effect, hue contrast effect, complementary color contrast effect, or the like can be further reduced, whereby work efficiency upon performing color adjustments can be further enhanced.

Incidentally, the rendered content of the color chart 36c shown in FIG. 3A may be modified in various ways. Below, first through fourth modified example shall be described with reference to FIGS. 12A through 15.

Figure 12A:
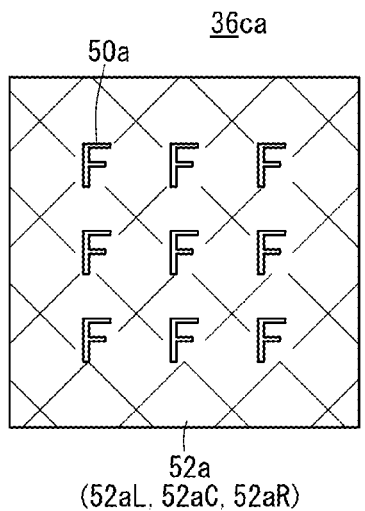
FIG. 12A shows a first modified example of the color chart shown in FIG. 3A.
Figure 12B:
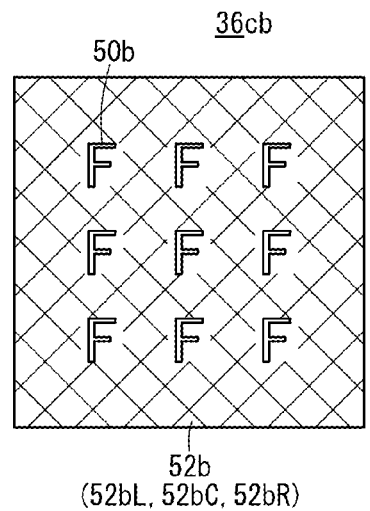
FIG. 12B shows a first modified example of the color chart shown in FIG. 3A.

FIG. 12A and FIG. 12B are frontal views, partially omitted, of color charts 36ca and 36cb according to a first modified example.

The color chart 36ca of FIG. 12A is obtained by extracting the target mark 46a and the background portion 48a, which reside in the first region 44a of the print sample 40 (see FIG. 2). As shown in FIG. 12A, the color of a surrounding region 52a (a lefthand region 52aL, a center region 52aC, and a righthand region 52aR), which surrounds each of color patches 50a, of the color chart 36ca may be set near in color to that of the background portion 48b (i.e., a color different from that of the background portion 48). A surrounding region 52b (a lefthand region 52bL, a center region 52bC, and a righthand region 52bR; see FIG. 12B), which surrounds each of color patches 50b, of the color chart 36cb, and a surrounding region 52c (a lefthand region 52cL, a center region 52cC, and a righthand region 52cR; see FIG. 12C), which surrounds each of color patches 50c, of a color chart 36cc are handled in a similar manner.

Further, similar to FIG. 12A, the color chart 36cb of FIG. 12B is obtained by extracting the target mark 46b and the background portion 48b, which reside in the second region 44b of the print sample 40 (see FIG. 2).

Figure 12C:
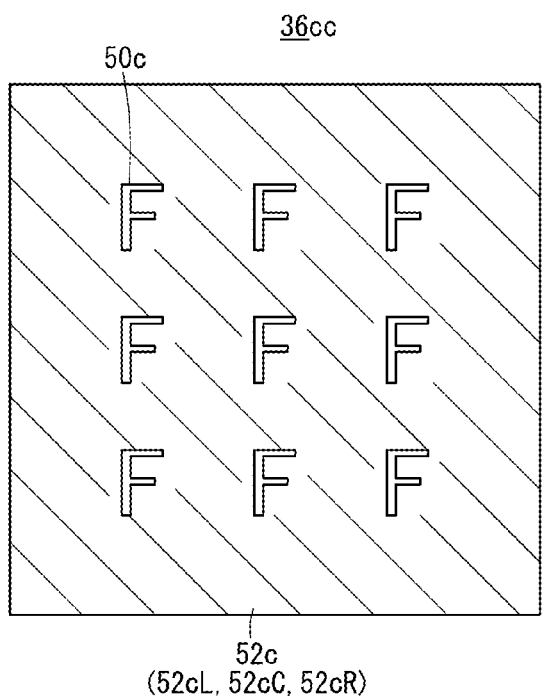
FIG. 12C shows a second modified example of the color chart shown in FIG. 3A.

FIG. 12C is a frontal view, partially omitted, of the color chart 36cc according to a second modified example. The color chart 36cc is obtained by extracting the target mark 46c and the background portion 48c, which reside in the third region 44c of the print sample 40 (see FIG. 2). As shown in FIG. 12C, the size of respective color patches 50c on the color chart 36cc may also be set to match the size of the target mark 46c on the print sample 40. In this case, by conforming the observed distance of the color chart 36cc to the observed distance of the print sample 40, the sense of matching (consistency) between the appearance of colors of the color patches 50c and the color of the target mark 46c can be enhanced.

Figure 13:
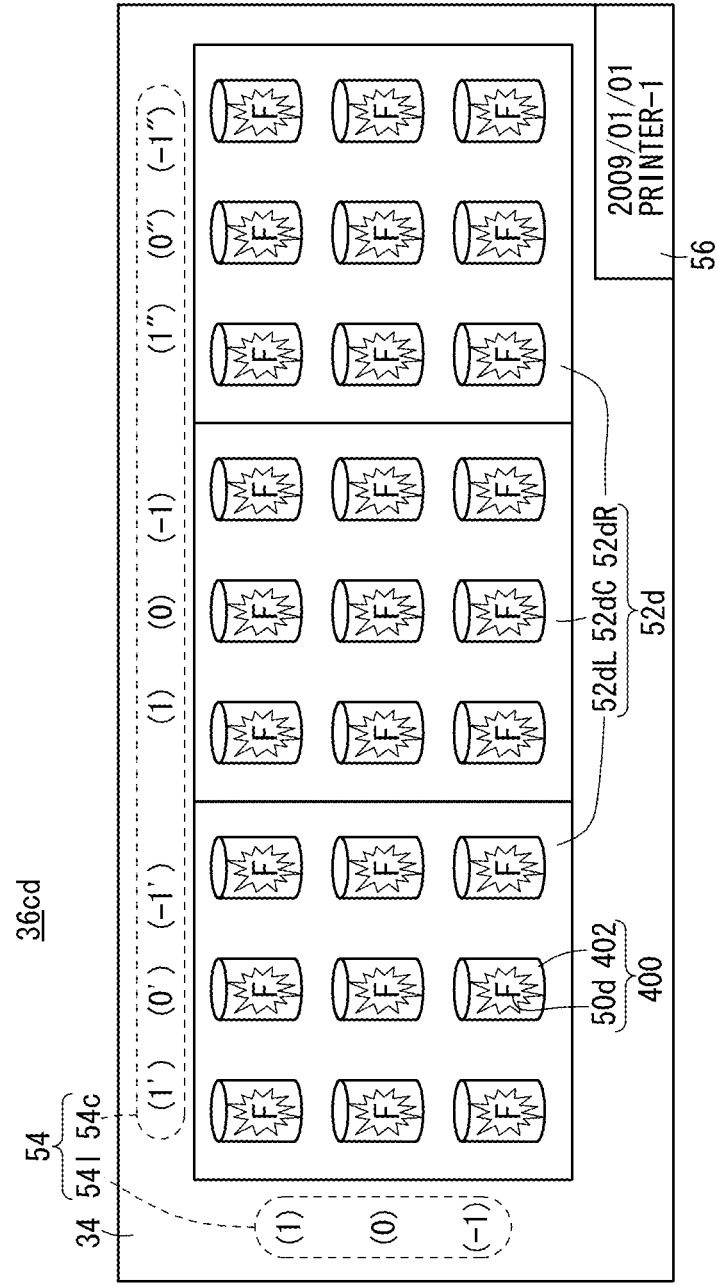
FIG. 13 shows a third modified example of the color chart shown in FIG. 3A.

FIG. 13 is an outline frontal view of a color chart 36cd according to a third modified example. The color chart 36cd is obtained by extracting from within the print sample 40 (see FIG. 2) the object 42 (along with the target mark 46d, which is enclosed by or included within the object 42) and the background portion 48d. The color chart 36cd includes a surrounding region 52d (a lefthand region 52dL, a center region 52dC, and a righthand region 52dR). As shown in FIG. 13, in place of the color patches 50, etc., differently colored objects 400 may be arranged on the color chart 36cd. The differently colored objects 400 are obtained by combining, respectively, a residual portion 402 in which the target mark 46d is cutout or clipped from the extracted object 42, and differently colored target marks 46d as a plurality of color patches 50d. Owing thereto, an aspect, which more closely resembles that of the print sample 40, can be observed for comparison.

Figure 14:
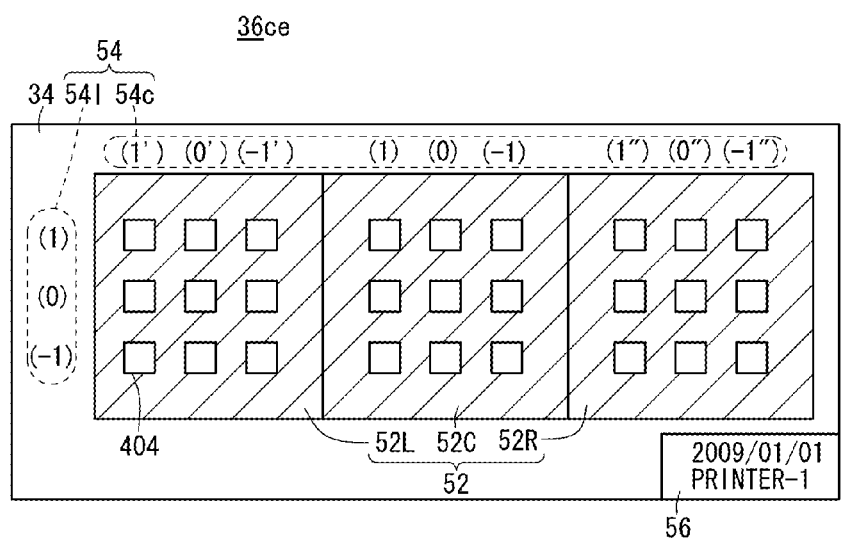
FIG. 14 shows a fourth modified example of the color chart shown in FIG. 3A.
Figure 15:
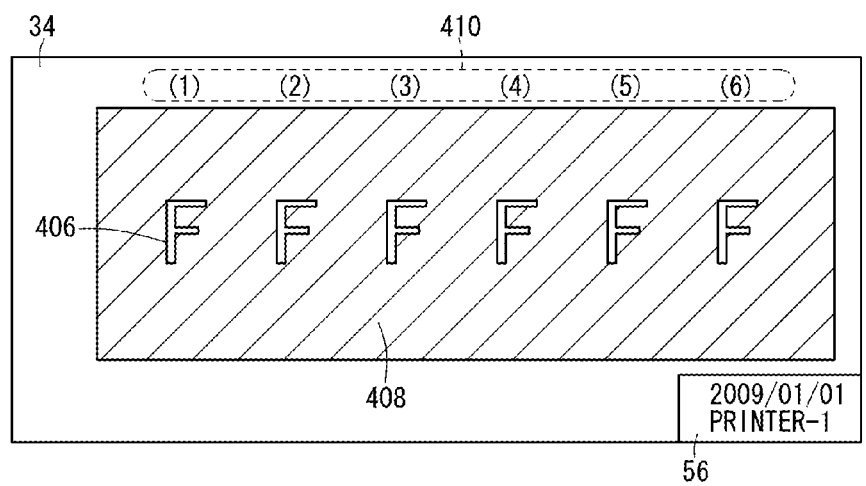
FIG. 15 shows a fourth modified example of the color chart shown in FIG. 3A.

FIG. 14 and FIG. 15 are outline frontal views of color charts 36ce, 36cf according to a fourth modified example. Below, exemplary methods shall be described using the color charts 36ce, 36cf of selecting a color that is closest to the designated color.

First, the image processing apparatus 16, after completion of operations analogous to steps S31 through S37 (see FIG.

6), causes the color chart 36ce of FIG. 14 to be printed by the printing machine 18. The color chart 36ce is a color chart for enabling a small number of candidate colors to be extracted from among a plurality of or a large number of (e.g., twenty-seven) colors.

The color chart 36ce shown in FIG. 14 has a configuration similar to that of the color chart 36c of FIG. 3A, but differs from the present embodiment (color patches 50) in that the twenty-seven color patches (hereinafter referred to as "rectangular patches" 404) are all rectangular shaped. The respective colors and count of the rectangular patches 404, similar to the case of the present embodiment, can be changed freely.

Then, using an evaluation means, such as comparative observation, colorimetry or the like, the operator tentatively selects a plurality of rectangular patches 404 from among the rectangular patches 404 on the color chart 36ce. The plural rectangular patches 404 that are selected are referred to as a candidate patch group. As such a candidate patch group, six individual rectangular patches 404 may tentatively be selected.

Next, responsive to an operation of the input device 26 made by the operator, the image processing apparatus 16 enters identification information (row numbers 541 and column numbers 54c) and a patch count for the candidate patch group via the I/F 80.

Then, the image processing apparatus 16, after completion of operations analogous to steps S31 through S37 (see FIG. 6), causes the color chart 36cf of FIG. 15 to be printed by the printing machine 18. The color chart 36cf, similar to the present embodiment (the color chart 36c of FIG. 3A), is a color chart for enabling a color patch 406 to be selected that is closest in color to the designated color.

The color chart 36cf shown in FIG. 15 is constituted by six color patches 406 having substantially the same shape, a surrounding region 408 that surrounds the color patches 406, identification numbers 410 that specify positions at which the color patches 406 are disposed, and print information 56.

The six color patches 406 are of the same colors as the six rectangular patches 404 that were tentatively selected as the candidate patch group. Further, the respective color patches 406 are of substantially the same size as the target mark 46 on the print sample 40. The operator selects, from among the six color patches 406 that are of the same size as the target mark 46, a color that is closest to the designated color.

In this manner, by sequentially printing the color chart 36ce and the color chart 36cf, a color patch 406 can be selected under a condition that resembles more closely that of the original. In particular, the color charts 36ce and 36cf are effective in the case that the actual size of the target mark 46 is large, and thus printing of several color patches 406 simultaneously would be difficult (for example, in a case where the size of the print medium 34 is restricted). Further, costs for recording materials (the print medium 34, ink, etc.) can be reduced.

In the illustrated embodiment, the printing machine 18 comprises an inkjet printing apparatus. However, the printing machine 18 that comprises an electrophotographic printer, a thermosensitive printer, or the like may achieve advantageous effects of the present invention. The output format of the printing machine 18 is not limited to hard copies, but may be soft copies. In other words, the principles of the present invention may be applied to various image display apparatus or to various image display processes.

Further, with the present embodiment, patterns of the color patches 50 have been described focused on a uniform color. However, the present invention is not limited by this feature, and various changes can be made accompanying the pattern of the target mark 46. For example, periodic or non-periodic patterns can be applied thereto, including stripes, dots, and other patterns or textures.

Although a certain preferred embodiment of the present invention has been shown and described in detail, it should be understood that various changes and modifications may be made to the embodiment without departing from the scope of the invention as set forth in the appended claims.

What is claimed is:

1. A color value acquiring method comprising:
   an entry step of entering a shape of a target mark extracted from within a print sample and to be reproduced on a print;
   a printing step of printing a color chart comprising a plurality of color patches in which the shape of the entered target mark is simulated;
   a color value acquiring step of acquiring a color value, which corresponds to a color patch selected as representing a color that is close to a designated color to be reproduced, from within the printed color chart; and
   wherein, in the entry step, partial data representative of the print sample are extracted and entered as the shape of the target mark.

2. The color value acquiring method according to claim 1, further comprising:
   a size determining step of determining a data area size for each of the color patches, corresponding to an output resolution of the print sample; and
   a generating step of generating image data for printing the color chart based on the determined data area size.

3. The color value acquiring method according to claim 2, wherein the size determining step comprises determining the data area size, such that a size of the respective color patches on the color chart matches a size of the target mark on the print sample.

4. The color value acquiring method according to claim 2, wherein the size determining step comprises determining the data area size, such that a size of the respective color patches on the color chart is a constant value irrespective of the output resolution.

5. The color value acquiring method according to claim 1, wherein the entry step further includes entering color information of the target mark, the color value acquiring method further comprising:
   a determining step of determining respective colors of the plurality of color patches, based on the entered color information of the target mark.

6. The color value acquiring method according to claim 1, further comprising a standard color correcting step of correcting a standard color which is close to the designated color, corresponding to a difference between a size of the color patches on the color chart and a size of the target mark on the print sample.

7. The color value acquiring method according to claim 1, wherein the entry step further includes entering color information of a background portion of the target mark, the color value acquiring method further comprising:
   a region color determining step of determining a color of a surrounding region that surrounds the plurality of color patches, based on the entered color information of the background portion.

8. The color value acquiring method according to claim 7, wherein the entry step further includes entering a plurality of color values obtained by colorimetrically measuring a plurality of locations within a region of the background portion, and the region color determining step includes determining the color of the surrounding region using a statistical process with respect to the entered plurality of color values.

9. A color value acquiring method comprising:
an entry step of entering a shape of a target mark extracted from within a print sample and to be reproduced on a print;
a printing step of printing a color chart comprising a plurality of color patches in which the shape of the entered target mark is simulated;
a color value acquiring step of acquiring a color value, which corresponds to a color patch selected as representing a color that is close to a designated color to be reproduced, from within the printed color chart; and
an extraction step of extracting from within the print sample an object in which the target mark is included,
wherein the color chart comprises a plurality of objects of different colors each obtained by combining a residual portion in which the target mark is clipped from the extracted object and each of target marks of different colors as the plurality of color patches.

10. An image processing method comprising:
an entry step of entering a shape of a target mark extracted from within a print sample and to be reproduced on a print;
a printing step of printing a color chart comprising a plurality of color patches in which the shape of the entered target mark is simulated;
a first acquiring step of acquiring a first color value, which corresponds to a color patch selected as representing a color that is close to a designated color to be reproduced, from within the printed color chart;
a second acquiring step of acquiring a second color value, which is a color value of the designated color; and
a color adjusting step of performing color adjustment on the print to be printed, based on the acquired first color value and the acquired second color value,
wherein, in the entry step, partial data representative of the print sample are extracted and entered as the shape of the target mark.

11. A color value acquiring apparatus comprising:
a sample shape acquirer for acquiring a shape of a target mark extracted from within a print sample and to be reproduced on a print;
an image data generator for generating image data for printing a color chart comprising a plurality of color patches in which the shape of the target mark acquired by the sample shape acquirer is simulated; and
a color value acquirer for acquiring a color value, as a selected color value, which corresponds to a color patch selected as representing a color that is close to a designated color to be reproduced, from within the color chart, which is printed based on the image data generated by the image data generator
wherein the sample shape acquirer extracts partial data representative of the print sample and acquires the partial data as the shape of the target mark.

12. The color value acquiring apparatus according to claim 11, further comprising a display unit for displaying color information pertaining to the selected color value acquired by the color value acquirer.

13. The color value acquiring apparatus according to claim 12, further comprising:
a data converter for converting the selected color value into device dependent data of a printing machine using a profile of the printing machine for printing the print,
wherein the display unit further displays the device dependent data, which has been converted by the data converter.

14. An image processing apparatus comprising:
a sample shape acquirer for acquiring a shape of a target mark extracted from within a print sample and to be reproduced on a print;
an image data generator for generating image data for printing a color chart comprising a plurality of color patches in which the shape of the target mark acquired by the sample shape acquirer is simulated;
a first color value acquirer for acquiring a first color value, which corresponds to a color patch selected as representing a color that is close to a designated color to be reproduced, from within the color chart, which is printed based on the image data generated by the image data generator;
a second color value acquirer for acquiring a second color value, which is a color value of the designated color; and
a print color adjuster for performing color adjustment on the print to be printed, based on the first color value acquired by the first color value acquirer and the second color value acquired by the second color value acquirer
wherein the sample shape acquirer extracts partial data representative of the print sample and acquires the partial data as the shape of the target mark.

15. A non-transitory recording medium storing therein a program for acquiring a color value, the program enabling a computer to function as:
a sample shape acquirer for acquiring a shape of a target mark extracted from within a print sample and to be reproduced on a print;
an image data generator for generating image data for printing a color chart comprising a plurality of color patches in which the shape of the target mark acquired by the sample shape acquirer is simulated; and
a color value acquirer for acquiring a color value, which corresponds to a color patch selected as representing a color that is close to a designated color to be reproduced, from within the color chart, which is printed based on the image data generated by the image data generator,
wherein the sample shape acquirer extracts partial data representative of the print sample and acquires the partial data as the shape of the target mark.

16. An image processing method comprising:
an entry step of entering a shape of a target mark extracted from within a print sample and to be reproduced on a print;
a printing step of printing a color chart comprising a plurality of color patches in which the shape of the entered target mark is simulated;
a first acquiring step of acquiring a first color value, which corresponds to a color patch selected as representing a color that is close to a designated color to be reproduced, from within the printed color chart;
a second acquiring step of acquiring a second color value, which is a color value of the designated color;
a color adjusting step of performing color adjustment on the print to be printed, based on the acquired first color value and the acquired second color value; and
an extraction step of extracting from within the print sample an object in which the target mark is included,
wherein the color chart comprises a plurality of objects of different colors each obtained by combining a residual portion in which the target mark is clipped from the extracted object and each of target marks of different colors as the plurality of color patches.

17. A color value acquiring apparatus comprising: a sample shape acquirer for acquiring a shape of a target mark extracted from within a print sample and to be reproduced on a print;
- an image data generator for generating image data for printing a color chart comprising a plurality of color patches in which the shape of the target mark acquired by the sample shape acquirer is simulated; and
- a color value acquirer for acquiring a color value, as a selected color value, which corresponds to a color patch selected as representing a color that is close to a designated color to be reproduced, from within the color chart, which is printed based on the image data generated by the image data generator,
- wherein the sample shape acquirer extracts from within the print sample an object in which the target mark is included, and
- wherein the image data generator generates image data for printing the color chart comprising a plurality of objects of different colors each obtained by combining a residual portion in which the target mark is clipped from the extracted object and each of target marks of different colors as the plurality of color patches.

18. An image processing apparatus comprising: a sample shape acquirer for acquiring a shape of a target mark extracted from within a print sample and to be reproduced on a print;
- an image data generator for generating image data for printing a color chart comprising a plurality of color patches in which the shape of the target mark acquired by the sample shape acquirer is simulated;
- a first color value acquirer for acquiring a first color value, which corresponds to a color patch selected as representing a color that is close to a designated color to be reproduced, from within the color chart, which is printed based on the image data generated by the image data generator; a second color value acquirer for acquiring a second color value, which is a color value of the designated color; and
- a print color adjuster for performing color adjustment on the print to be printed, based on the first color value acquired by the first color value acquirer and the second color value acquired by the second color value acquirer,
- wherein the sample shape acquirer extracts from within the print sample an object in which the target mark is included, and
- wherein the image data generator generates image data for printing the color chart comprising a plurality of objects of different colors each obtained by combining a residual portion in which the target mark is clipped from the extracted object and each of target marks of different colors as the plurality of color patches.

19. A non-transitory recording medium storing therein a program for acquiring a color value, the program enabling a computer to function as:
- a sample shape acquirer for acquiring a shape of a target mark extracted from within a print sample and to be reproduced on a print;
- an image data generator for generating image data for printing a color chart comprising a plurality of color patches in which the shape of the target mark acquired by the sample shape acquirer is simulated; and
- a color value acquirer for acquiring a color value, which corresponds to a color patch selected as representing a color that is close to a designated color to be reproduced, from within the color chart, which is printed based on the image data generated by the image data generator,
- wherein the sample shape acquirer extracts from within the print sample an object in which the target mark is included, and
- wherein the image data generator generates image data for printing the color chart comprising a plurality of objects of different colors each obtained by combining a residual portion in which the target mark is clipped from the extracted object and each of target marks of different colors as the plurality of color patches.

* * * * *